United States Patent
Xu et al.

(10) Patent No.: US 11,481,014 B2
(45) Date of Patent: Oct. 25, 2022

(54) POWER CONTROL METHOD BASED ON USER HABIT AND TERMINAL

(71) Applicant: HUAWEI TECHNOLOGIES CO., LTD., Guangdong (CN)

(72) Inventors: Yuqiong Xu, Hangzhou (CN); Shidong Ren, Shenzhen (CN); Zhenkun Zhou, Hangzhou (CN)

(73) Assignee: Huawei Technologies Co., Ltd., Guangdong (CN)

(*) Notice: Subject to any disclaimer, the term of this patent is extended or adjusted under 35 U.S.C. 154(b) by 0 days.

(21) Appl. No.: 17/060,644

(22) Filed: Oct. 1, 2020

(65) Prior Publication Data

US 2021/0018972 A1 Jan. 21, 2021

Related U.S. Application Data

(63) Continuation of application No. PCT/CN2019/104448, filed on Sep. 4, 2019.

(30) Foreign Application Priority Data

Sep. 25, 2018 (CN) .......................... 201811118244.4

(51) Int. Cl.
*G06F 1/32* (2019.01)
*G06F 1/3231* (2019.01)
*G06F 1/3212* (2019.01)

(52) U.S. Cl.
CPC .......... *G06F 1/3231* (2013.01); *G06F 1/3212* (2013.01)

(58) Field of Classification Search
CPC ....................................................... G06F 1/32
See application file for complete search history.

(56) References Cited

U.S. PATENT DOCUMENTS

| | | |
|---|---|---|
| 2009/0164152 A1 | 6/2009 | Creus et al. |
| 2010/0162024 A1* | 6/2010 | Kuris ................. G06F 11/3062 713/340 |

(Continued)

FOREIGN PATENT DOCUMENTS

| | | |
|---|---|---|
| CN | 101635771 B | 7/2012 |
| CN | 103986831 A | 8/2014 |

(Continued)

OTHER PUBLICATIONS

Danhui, "Statistical Forecasting: Methods and Applications," China Statistics Press, Apr. 2001, 1 page (with English abstract).

(Continued)

*Primary Examiner* — Paul B Yanchus, III
(74) *Attorney, Agent, or Firm* — Fish & Richardson P.C.

(57) ABSTRACT

This application provides a power control method based on a user habit and a terminal. The method includes determining, by the terminal, a charge cycle based on a historical charge status, where the charge cycle reflects a charging habit of a user. The method also includes predicting, by the terminal, a charge cycle within a next time period based on the charge cycle. The method further includes determining, by the terminal, a power allocation scheme in the charge cycle within the next time period based on historical power consumption information in one or more charge cycles. The method also includes controlling, by the terminal, use of battery power according to the power allocation scheme.

18 Claims, 7 Drawing Sheets

(56) References Cited

U.S. PATENT DOCUMENTS

| | | |
|---|---|---|
| 2012/0210150 A1 | 8/2012 | De Lind Van Wijngaarden et al. |
| 2012/0324578 A1 | 12/2012 | Seinfeld et al. |
| 2013/0191662 A1* | 7/2013 | Ingrassia, Jr. ......... G06F 1/3206 |
| | | 713/320 |
| 2014/0366042 A1 | 12/2014 | Chan et al. |
| 2016/0157180 A1 | 6/2016 | Brown et al. |
| 2017/0249004 A1 | 8/2017 | Flores Assad et al. |

FOREIGN PATENT DOCUMENTS

| | | |
|---|---|---|
| CN | 104301499 A | 1/2015 |
| CN | 106569580 A | 4/2017 |
| CN | 106663362 A | 5/2017 |
| CN | 107483751 A | 12/2017 |
| CN | 108112063 A | 6/2018 |
| WO | 2015062504 A1 | 5/2015 |

OTHER PUBLICATIONS

Office Action issued in Chinese Application No. 201811118244.4 dated Aug. 4, 2021, 9 pages (with English translation).
Gupta et al., "Dynamic Power Budgeting for Mobile Systems Running Graphics Workloads" IEEE Transactions on Multi-Scale Computing Systems, vol. 4, No. 1, Jan.-Mar. 2018, 11 pages.
PCT International Search Report and Written Opinion in International Application No. PCT/CN2019/104,448, dated Dec. 5, 2019, 12 pages (With Partial English Translation).
Extended European Search Report issued in European Application No. 19866157.1 dated Nov. 4, 2021, 7 pages.

* cited by examiner

POWER CONTROL METHOD BASED ON USER HABIT AND TERMINAL

CROSS-REFERENCE TO RELATED APPLICATIONS

This application is a continuation of International Patent Application No. PCT/CN2019/104448, filed on Sep. 4, 2019, which claims priority to Chinese Patent Application No. 201811118244.4, filed on Sep. 25, 2018. The disclosures of the aforementioned applications are hereby incorporated by reference in their entireties.

TECHNICAL FIELD

The present invention relates to the field of computer technologies, and in particular, to a power control method based on a user habit and a terminal.

BACKGROUND

Power of a mobile phone is an important factor that restricts user experience. Use of a large quantity of games, videos, and Virtual Reality (VR)/Augmented Reality (AR) applications and other types of applications makes the mobile phone unable to be used for a whole day with available power. In addition, it may be expected that a development speed of a future battery technology is still lower than an improvement speed of chip performance, and higher calculation performance of a chip indicates more power consumption of the chip. Therefore, battery power of a mobile phone is a big bottleneck of use experience at present and in a foreseeable future. An effective power/power consumption management and control mechanism can greatly improve competitiveness of mobile phones, to form a selling point. A common power management method in the current industry includes: providing a power saving mode to allow for manual selection by a user, and reminding, when power is less than a specific threshold, the user whether to enable the power saving mode. In the power saving mode, the mobile phone only provides basic call and short message service functions or a limited Internet access capability. Therefore, power consumption can be greatly reduced in the power saving mode. However, only when the power is less than the specific threshold, the user is reminded to enable the power saving mode (for example, only when the power is less than 20%, the user is reminded to enter the power saving mode). This has a comparatively limited effect on prolonging a battery life.

SUMMARY

Embodiments of the present invention disclose a power control method based on a user habit and a terminal, which are able to improve a battery life.

According to a first aspect, an embodiment of this application provides a power control method based on a user habit, where the method includes: determining, by a terminal, a charge cycle within a time period based on a charge status within the time period, where the charge cycle is a time from an end time of current charging to a start time of next charging, the charge cycle is a time from an end time of current charging to an end time of next charging, the charge cycle is a time from a start time of current charging to a start time of next charging, or the charge cycle is a time from a start time of current charging to an end time of next charging; predicting, by the terminal based on the charge cycle within the time period, a charge cycle after the time period; determining, by the terminal based on power consumption information in the charge cycle within the time period, a power allocation scheme in the charge cycle after the time period, where the power allocation scheme indicates available power in each of a plurality of time segments, or indicates available power of each of a plurality of objects, and each object is one application or one type of application; and controlling, by the terminal, use of battery power according to the power allocation scheme.

The method provided in the first aspect may also be described as follows: predicting, by a terminal, a next charge cycle and a power allocation scheme in the charge cycle based on historical power usage information, where the power allocation scheme is used to indicate available power in each of a plurality of time segments or is used to indicate available power of each of a plurality of objects and each object is one application or one type of application, and the historical power usage information includes a charge status and power consumption information in a past time segment; and controlling, by the terminal, use of battery power according to the power allocation scheme.

It can be learned that according to the method provided in the first aspect, the terminal may automatically obtain, by analyzing, a charge cycle within a time period based on a charging start moment and a charging end moment; then estimate, based on the charge cycle within the time period, a charge cycle that may exist after the time period; and further plan power for the estimated charge cycle after the time period according to a power usage rule in the charge cycle within the time period, so that battery power of the terminal is used in a balanced and appropriate manner, thereby effectively prolonging a battery life of the terminal. In addition, the charge cycle within the time period and the charge cycle after the time period are obtained by the terminal by automatically analyzing, and manually setting is not required, providing better user experience.

In some implementations, if the power allocation scheme indicates available power of each of a plurality of objects, the power allocation scheme further indicates backup public power; and the controlling, by the terminal, use of battery power according to the power allocation scheme includes: if remaining power obtained after power allocated to a target object in the plurality of objects is used is less than a preset value, obtaining, by the terminal according to a first preset rule, partial power that is from the public power and that is to be used by the target object. In other words, in this embodiment of this application, partial public power is further reserved in a power planning process, and when power usage is inconsistent with expected power usage when exceptions occur (especially when the planned power is insufficient), partial power is contended from the public power for a corresponding time segment or object for use, to ensure that the terminal can be normally used when the exceptions occur.

In some implementations, if the power allocation scheme indicates available power of each of a plurality of objects, the controlling, by the terminal, use of battery power according to the power allocation scheme includes: if remaining power obtained after power allocated to a target object in the plurality of objects is used is less than a preset value, allocating, by the terminal according to a second preset rule, partial power that is from power allocated to another object and that is to be used by the target object, where the another object is one or more objects in the plurality of objects except the target object. To be specific, there is a power borrowing mechanism between different objects. When remaining power of one of the objects is very little, power may be borrowed from another object in a timely manner according to a corresponding rule, to ensure normal use of the terminal.

In some implementations, the controlling, by the terminal, use of battery power according to the power allocation scheme includes: controlling, by the terminal, the use of the battery power by using a resource template that matches the power allocation scheme, where the resource template is used to define a frequency or a frequency adjustment policy of one or more of a central processing unit CPU, a graphics processing unit GPU, or a double data rate synchronous dynamic random access memory DDR. The "matching" herein may be pre-configuring a default resource template (resource templates configured for different power allocation schemes may be the same or may be different). It may be understood that power consumption speeds of the different resource templates are different. Therefore, power usage is determined according to two factors: a power allocation scheme and a resource template, so that the power can be used more appropriately.

In some implementations, if the power allocation scheme indicates available power of each of a plurality of objects, the controlling, by the terminal, the use of the battery power by using a resource template that matches the power allocation scheme includes: if remaining power obtained after power allocated to a target object in the plurality of objects is used is less than a preset value, updating, by the terminal, the resource template, where a power consumption speed of an updated resource template is lower than a power consumption speed of a to-be-updated resource template. To be specific, when it is found that the battery power of the terminal is used relatively fast, the resource template may be replaced in a timely manner. When a resource template having a comparatively low power consumption speed is used, a subsequent power consumption speed of the terminal may be reduced, thereby prolonging a battery life of the terminal.

In some implementations, if the power allocation scheme indicates available power in each of a plurality of time segments, the controlling, by the terminal, the use of the battery power by using a resource template that matches the power allocation scheme includes: if a power consumption speed in a target time segment in the plurality of time segments is greater than a preset speed threshold, updating, by the terminal, the resource template, where a power consumption speed of an updated resource template is lower than a power consumption speed of a to-be-updated resource template, and the updated resource template is used by the terminal in one or more time segments after the target time segment. To be specific, when it is found that the battery power of the terminal is used relatively fast, the resource template may be replaced in a timely manner. When a resource template having a comparatively low power consumption speed is used, a subsequent power consumption speed of the terminal may be reduced, thereby prolonging a battery life of the terminal.

In some implementations, the controlling, by the terminal, the use of the battery power by using a resource template that matches the power allocation scheme includes: if the terminal determines that a usage scene of the terminal is changed to a preset usage scene, updating, by the terminal, the resource template, where the updated resource template is a resource template corresponding to the preset usage scene, and correspondences between a plurality of application scenes and a plurality of resource templates are pre-stored by the terminal. It may be understood that the user has different power supply capabilities in different scenes. For example, a power supply capability at home is much stronger than a power supply capability in a traveling journey. Therefore, a user may be given a resource template with higher performance when the user uses the terminal at home. In this way, even if a power consumption speed of the resource template with higher performance is very high, power can be supplied in a timely manner after the power is drained, and normal use of the terminal is not affected.

In some implementations, total power allocated in the power allocation scheme is equal to a difference between remaining battery power when the power allocation scheme is determined and reserve power, where the reserve power is calculated based on remaining battery power when charging starts in the charge cycle within the time period. It can be understood that during a power allocation, only partial battery power is allocated, instead of allocating all the power, so that partial power of the terminal is required when the battery is not fully charged. This can improve user experience.

In some implementations, if the power allocation scheme indicates available power in each of a plurality of time segments in the charge cycle after the time period, the power consumption information includes power overheads in each of the plurality of time segments in the charge cycle within the time period; or if the power allocation scheme indicates available power of each of a plurality of objects, the power consumption information includes power overheads of each of the objects in the charge cycle within the time period.

According to a second aspect, an embodiment of this application provides a terminal, where the terminal includes a processor and a memory, the memory is configured to store a computer-readable instruction, and the processor is configured to read the computer-readable instruction and implement: determining a charge cycle within a time period based on a charge status within the time period, where the charge cycle is a time from an end time of current charging to a start time of next charging, the charge cycle is a time from an end time of current charging to an end time of next charging, the charge cycle is a time from a start time of current charging to a start time of next charging, or the charge cycle is a time from a start time of current charging to an end time of next charging; predicting, based on the charge cycle within the time period, a charge cycle after the time period; determining, based on power consumption information in the charge cycle within the time period, a power allocation scheme in the charge cycle after the time period, where the power allocation scheme indicates available power in each of a plurality of time segments, or indicates available power of each of a plurality of objects, and each object is one application or one type of application; and controlling use of battery power according to the power allocation scheme.

The terminal provided in the second aspect may also be described as follows: the terminal includes a processor and a memory, where the memory is configured to store a computer-readable instruction, and the processor is configured to read the computer-readable instruction and implement: predicting, based on historical power usage information, a next charge cycle and a power allocation scheme in the charge cycle, where the power allocation scheme is used to indicate available power in each of a plurality of time segments or is used to indicate available power of each of a plurality of objects and each object is one application or one type of application, and the historical power usage information includes a charge status and power consumption information in a past time segment; and controlling, by the terminal, use of battery power according to the power allocation scheme.

It can be learned that according to the method provided in the second aspect, the terminal may automatically obtain, by analyzing, a charge cycle within a time period based on a charging start moment and a charging end moment; then estimate, based on the charge cycle within the time period, a charge cycle that may exist after the time period; and further plan power for the estimated charge cycle after the time period according to a power usage rule in the charge cycle within the time period, so that battery power of the terminal is used in a balanced and appropriate manner, thereby effectively prolonging a battery life of the terminal. In addition, the charge cycle within the time period and the charge cycle after the time period are obtained by the terminal by automatically analyzing, and manually setting is not required, providing better user experience.

In some implementations, if the power allocation scheme indicates available power of each of a plurality of objects, the power allocation scheme further indicates backup public power; and the controlling, by the processor, use of battery power according to the power allocation scheme includes: if remaining power obtained after power allocated to a target object in the plurality of objects is used is less than a preset value, obtaining, according to a first preset rule, partial power that is from the public power and that is to be used by the target object. In other words, in this embodiment of this application, partial public power is further reserved in a power planning process, and when power usage is inconsistent with expected power usage when exceptions occur (especially when the planned power is insufficient), partial power is contended from the public power for a corresponding time segment or object for use, to ensure that the terminal can be normally used when the exceptions occur.

In some implementations, if the power allocation scheme indicates available power of each of a plurality of objects, the controlling, by the processor, use of battery power according to the power allocation scheme includes: if remaining power obtained after power allocated to a target object in the plurality of objects is used is less than a preset value, allocating, according to a second preset rule, partial power that is from power allocated to another object and that is to be used by the target object, where the another object is one or more objects in the plurality of objects except the target object. To be specific, there is a power borrowing mechanism between different objects. When remaining power of one of the objects is very little, power may be borrowed from another object in a timely manner according to a corresponding rule, to ensure normal use of the terminal.

In some implementations, the controlling, by the processor, use of battery power according to the power allocation scheme is: controlling the use of the battery power by using a resource template that matches the power allocation scheme, where the resource template is used to define a frequency or a frequency adjustment policy of one or more of a central processing unit (CPU), a graphics processing unit (GPU), or a double data rate synchronous dynamic random access memory (DDR). The "matching" herein may be pre-configuring a default resource template (resource templates configured for different power allocation schemes may be the same or may be different). It may be understood that power consumption speeds of the different resource templates are different. Therefore, power usage is determined according to two factors: a power allocation scheme and a resource template, so that the power can be used more appropriately.

In some implementations, if the power allocation scheme indicates available power of each of a plurality of objects, the controlling, by the processor, the use of the battery power by using a resource template that matches the power allocation scheme includes: if remaining power obtained after power allocated to a target object in the plurality of objects is used is less than a preset value, updating the resource template, where a power consumption speed of an updated resource template is lower than a power consumption speed of a to-be-updated resource template. To be specific, when it is found that the battery power of the terminal is used relatively fast, the resource template may be replaced in a timely manner. When a resource template having a comparatively low power consumption speed is used, a subsequent power consumption speed of the terminal may be reduced, thereby prolonging a battery life of the terminal.

In some implementations, if the power allocation scheme indicates available power in each of a plurality of time segments, the controlling, by the processor, the use of the battery power by using a resource template that matches the power allocation scheme includes: if a power consumption speed in a target time segment in the plurality of time segments is greater than a preset speed threshold, updating the resource template, where a power consumption speed of an updated resource template is lower than a power consumption speed of a to-be-updated resource template, and the updated resource template is used by the terminal in one or more time segments after the target time segment. To be specific, when it is found that the battery power of the terminal is used relatively fast, the resource template may be replaced in a timely manner. When a resource template having a comparatively low power consumption speed is used, a subsequent power consumption speed of the terminal may be reduced, thereby prolonging a battery life of the terminal.

In some implementations, the controlling, by the processor, the use of the battery power by using a resource template that matches the power allocation scheme includes: if it is determined that a usage scene of the terminal is changed to a preset usage scene, updating the resource template, where the updated resource template is a resource template corresponding to the preset usage scene, and correspondences between a plurality of application scenes and a plurality of resource templates are prestored by the terminal. It may be understood that the user has different power supply capabilities in different scenes. For example, a power supply capability at home is much stronger than a power supply capability in a traveling journey. Therefore, a user may be given a resource template with higher performance when the user uses the terminal at home. In this way, even if a power consumption speed of the resource template with higher performance is very high, power can be supplied in a timely manner after the power is drained, and normal use of the terminal is not affected.

In some implementations, total power allocated in the power allocation scheme is equal to a difference between remaining battery power when the power allocation scheme is determined and reserve power, where the reserve power is calculated based on remaining battery power when charging starts in the charge cycle within the time period. It can be understood that during a power allocation, only partial battery power is allocated, instead of allocating all the power, so that partial power of the terminal is required when the battery is not fully charged. This can improve user experience.

In some implementations, if the power allocation scheme indicates available power in each of a plurality of time segments in the charge cycle after the time period, the power consumption information includes power overheads in each of the plurality of time segments in the charge cycle within the time period; or if the power allocation scheme indicates available power of each of a plurality of objects, the power consumption information includes power overheads of each of the objects in the charge cycle within the time period.

According to a third aspect, an embodiment of this application provides a terminal, where the terminal includes some or all functional units configured to implement the power control method based on a user habit described in any one of the first aspect or possible implementations of the first aspect.

According to a fourth aspect, an embodiment of this application provides a computer-readable storage medium, where the computer-readable storage medium stores a program instruction, and when the program instruction is run on a processor of a terminal, the power control method based on a user habit described in any one of the first aspect or possible implementations of the first aspect is implemented.

According to a fifth aspect, an embodiment of this application provides a computer program product. When the computer program product is run on a processor of a terminal, the power control method based on a user habit described in any one of the first aspect or possible implementations of the first aspect is implemented.

For beneficial effects of the third aspect, the fourth aspect, and the fifth aspect, refer to descriptions in the first aspect and the corresponding implementations.

BRIEF DESCRIPTION OF DRAWINGS

The following describes the accompanying drawings used in embodiments of the present invention.

DESCRIPTION OF EMBODIMENTS

The following describes the embodiments of the present invention with reference to the accompanying drawings in the embodiments of the present invention.

Figure 1:
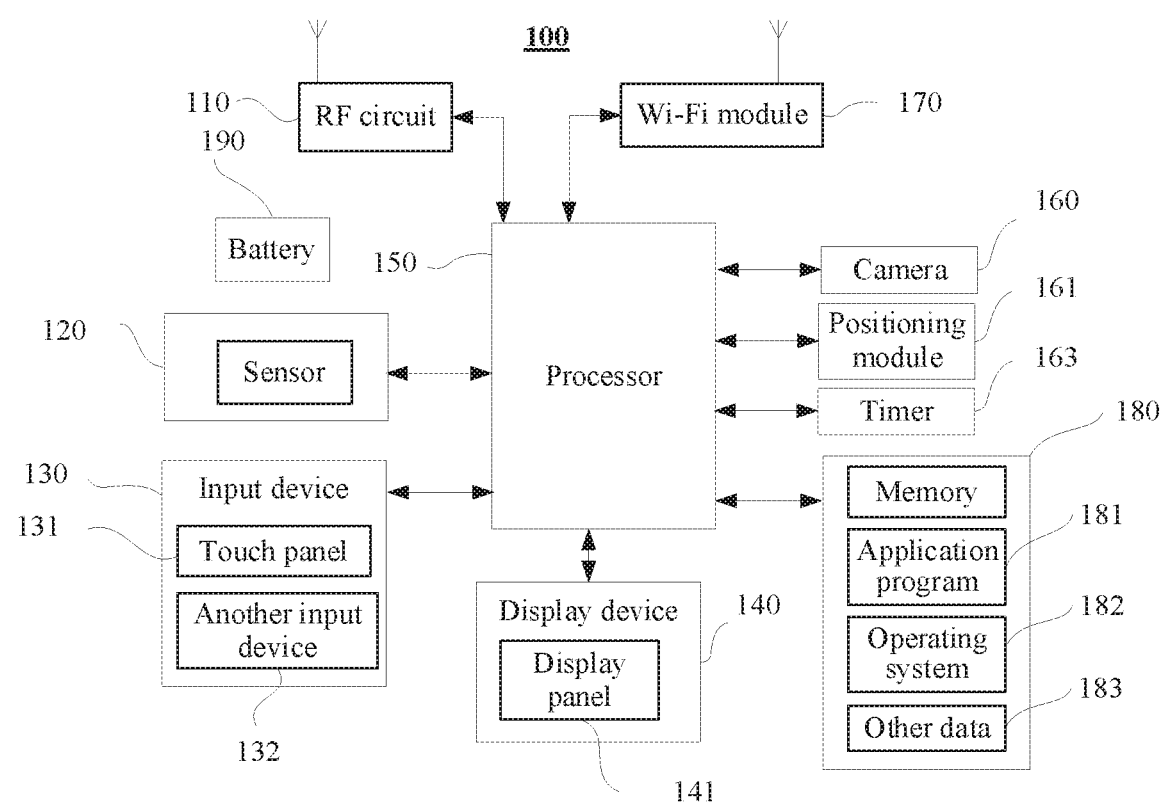
FIG. 1 is a schematic structural diagram of a terminal according to an embodiment of the present invention.

FIG. 1 is a schematic structural diagram of a terminal 100 to which an embodiment of the present invention is applied. The terminal 100 includes a memory 180, a processor 150, and a display device 140. The memory 180 stores a computer program. The computer program includes an operating system program 182, an application program 181, and the like; and the application program 181 includes a browser program. The processor 150 is configured to: read the computer program in the memory 180, and then perform a method defined by the computer program. For example, the processor 150 reads the operating system program 182 to run an operating system on the terminal 100 and implement various functions of the operating system, or reads one or more application programs 181 to run an application on the terminal, for example, reads the browser program to run a browser.

The processor 150 may include one or more processors. For example, the processor 150 may include one or more central processing units. When the processor 150 includes a plurality of processors, the plurality of processors may be integrated into a same chip, or may each be an independent chip. A processor may include one or more processing cores. That the processor includes a plurality of cores is used as an example for description in the following embodiments. However, a power control method based on a user habit according to the embodiments of the present invention may be applied to a single-core processor.

In addition, the memory 180 further stores other data 183 in addition to the computer program. The other data 183 may include data generated after the operating system program 182 or the application program 181 is run, and the data includes system data (for example, a configuration parameter of the operating system) and user data. For example, battery usage information (a charging start moment, a charging end moment, power consumption of each (or each type of) application, power consumption of each time period, and the like) of a user that is collected by the terminal may be considered as the user data.

The memory 180 usually includes an internal memory and an external storage. The internal memory may be a random access memory (RAM), a read only memory (ROM), a cache (CACHE), or the like. The external storage may be a hard disk, a compact disk, a USB, a floppy disk, a tape drive, or the like. The computer program is usually stored in the external storage. Before performing processing, the processor loads the computer program from the external storage to the internal memory. In this embodiment of the present invention, the battery usage information of the user may be stored in the external storage, and when the information needs to be used, the information may be first loaded to the internal memory.

The operating system program 182 includes a computer program that can implement the power control method based on a user habit according to the embodiments of the present invention, so that after the processor 150 reads the operating system program 182 and runs the operating system, the operating system may have a power control (or management) function according to the embodiments of the present invention. Further, the operating system can open a call interface of a function of the power control method based on a user habit to an upper-layer application. After the processor 150 reads the application program 181 from the memory 180 and runs the application, the application can call, by using the call interface, the power control function provided in the operating system, to control (or manage) battery power.

The terminal 100 includes a battery 190 configured to supply power to another module in the terminal. The battery may be a rechargeable battery or a non-rechargeable battery, and there may be one or more batteries.

The terminal 100 may further include an input device 130, configured to: receive digital information, character information, or a contact touch operation/non-contact gesture that is input, and generate signal input and the like related to user settings and function control of the terminal 100, and the like. In this embodiment of the present invention, the input device 130 may include a touch panel 131. The touch panel 131, also referred to as a touchscreen, may collect a touch operation performed by a user on or near the touch panel 131 (for example, an operation performed by the user on the touch panel 131 or near the touch panel 131 by using any proper object or accessory such as a finger or a stylus), and drive a corresponding connection apparatus based on a preset program. Optionally, the touch panel 131 may include two parts: a touch detection apparatus and a touch controller. The touch detection apparatus detects a touch direction of the user, detects a signal brought by a touch operation, and transfers the signal to the touch controller. The touch controller receives touch information from the touch detection apparatus, converts the touch information into coordinates of a touch point, and then sends the coordinates of the touch point to the processor 150. The touch controller may further receive and execute a command sent by the processor 150. For example, the user clicks a virtual button on the touch panel 131 by using a finger, the touch detection apparatus detects this signal brought by this click, and then transfers the signal to the touch controller, the touch controller then converts this signal into coordinates and sends the coordinates to the processor 150, and the processor 150 determines, based on the coordinates and a type of this signal (a tap or a double tap), an operation to be performed by the user, and displays, on the display panel 141, a result of the operation.

The touch panel 131 may be implemented by using a plurality of types such as a resistive type, a capacitive type, an infrared type, and a surface acoustic wave type. In addition to the touch panel 131, the input device 130 may include another input device 132. The another input device 132 may include but is not limited to one or more of a physical keyboard, a function key (such as a volume control key or an on/off key), a trackball, a mouse, a joystick, and the like.

The terminal 100 may further include the display device 140. The display device 140 includes a display panel 141, configured to display information entered by a user or information provided for a user, various menu interfaces of the terminal 100, and the like. The display device 140 may include the touch panel 131. Optionally, the display panel 141 may be configured in a form such as a Liquid Crystal Display (LCD) or an Organic Light-Emitting Diode (OLED). In some other embodiments, the touch panel 131 may cover the display panel 141 to form a touch display screen.

Besides the foregoing, the terminal 100 may further include a camera 160 configured to take a photograph or a video, a positioning module (for example, a GPS) 161 for obtaining a geographic location of the terminal, and a timer 163 for recording time. In addition, the terminal 100 may include one or more sensors 120, for example, an acceleration sensor or an optical sensor. The terminal 100 may further include a radio frequency (RF) circuit 110, configured to perform network communication with a wireless network device, and may further include a Wi-Fi module 170, configured to perform Wi-Fi communication with another device.

The foregoing mainly describes specific procedures of the methods provided in the embodiments of the present invention. The following describes, with reference to FIG. 2 by using an Android operating system as an example, implementation locations and running statuses of the methods provided in the embodiments of the present invention. For a more detailed method procedure, refer to the description in the foregoing embodiments.

Figure 2:
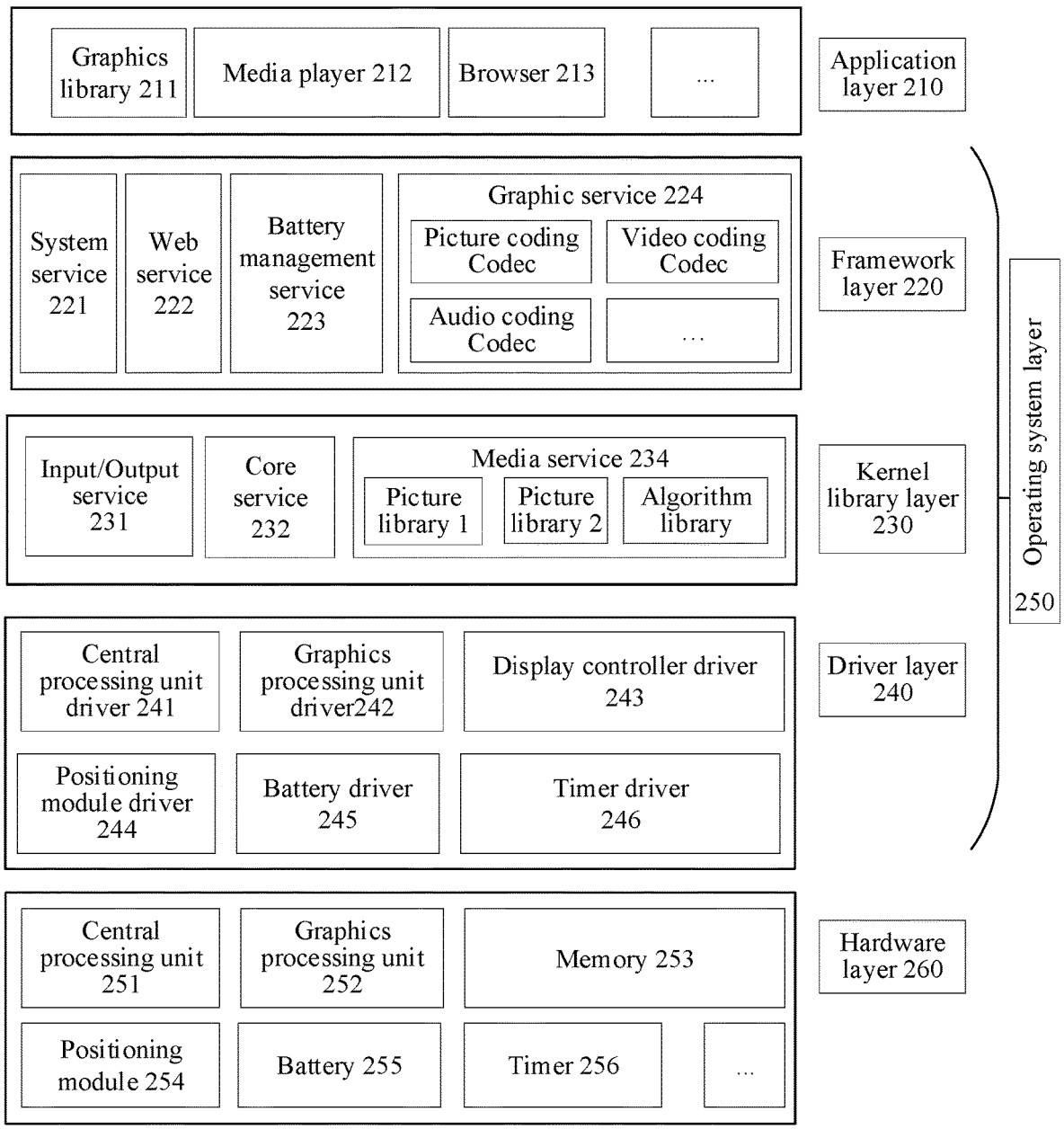
FIG. 2 is a schematic structural diagram of another terminal according to an embodiment of the present invention.

FIG. 2 is a schematic structural diagram of a terminal 200 according to an embodiment of the present invention. The terminal 200 includes an application layer 210 and an operating system layer 250, and the operating system may be an Android operating system. The operating system layer 250 is further divided into a framework layer 220, a kernel library layer 230, and a driver layer 240. The operating system layer 250 in FIG. 2 may be considered as a specific implementation of the operating system program 182 in FIG. 1, and the application layer 210 in FIG. 2 may be considered as a specific implementation of the application program 181 in FIG. 1. The driver layer 240 includes a CPU driver 241, a GPU driver 242, a display controller driver 243, a positioning module driver 244, a battery driver 245, a timer driver 246, and the like. The kernel library layer 230 is a core part of the operating system and includes an input/output service 231, a core service 232, a media service 234, and the like. The media service 234 includes a picture library 1 in a JPEG format, a picture library 2 in a PNG format, and a picture library in another format. The framework layer 220 may include a graphic service 224, a system service 221, a web service 222, a battery management service 223, and the like. The graphic service 224 may include, for example, a picture encoding Codec and an audio encoding Codec. The application layer 210 may include a graphics library 211, a media player 212, a browser 213, and the like.

Additionally, under the driver layer 240, the terminal 200 further includes a hardware layer 260. The hardware layer of the terminal 200 may include a Central Processing Unit (CPU) 251 and a Graphic Processing Unit (GPU) 252 (equivalent to a specific implementation of the processor 150 in FIG. 1), and may further include a memory 253 (equivalent to the memory 180 in FIG. 1), including an internal memory and an external storage. The hardware layer may further include a positioning module 254 (equivalent to the positioning module 161 in FIG. 1) and a battery 255 (equivalent to the battery 190 in FIG. 1), and may further include a timer 256 (equivalent to the timer 163 in FIG. 1), and may further include one or more sensors (equivalent to the sensor 120 in FIG. 1). Certainly, in addition, the hardware layer 260 may further include the camera, the RF circuit, and the Wi-Fi module shown in FIG. 1, and may further include other hardware modules not shown in FIG. 1, for example, a memory controller and a display controller.

Figure 3:
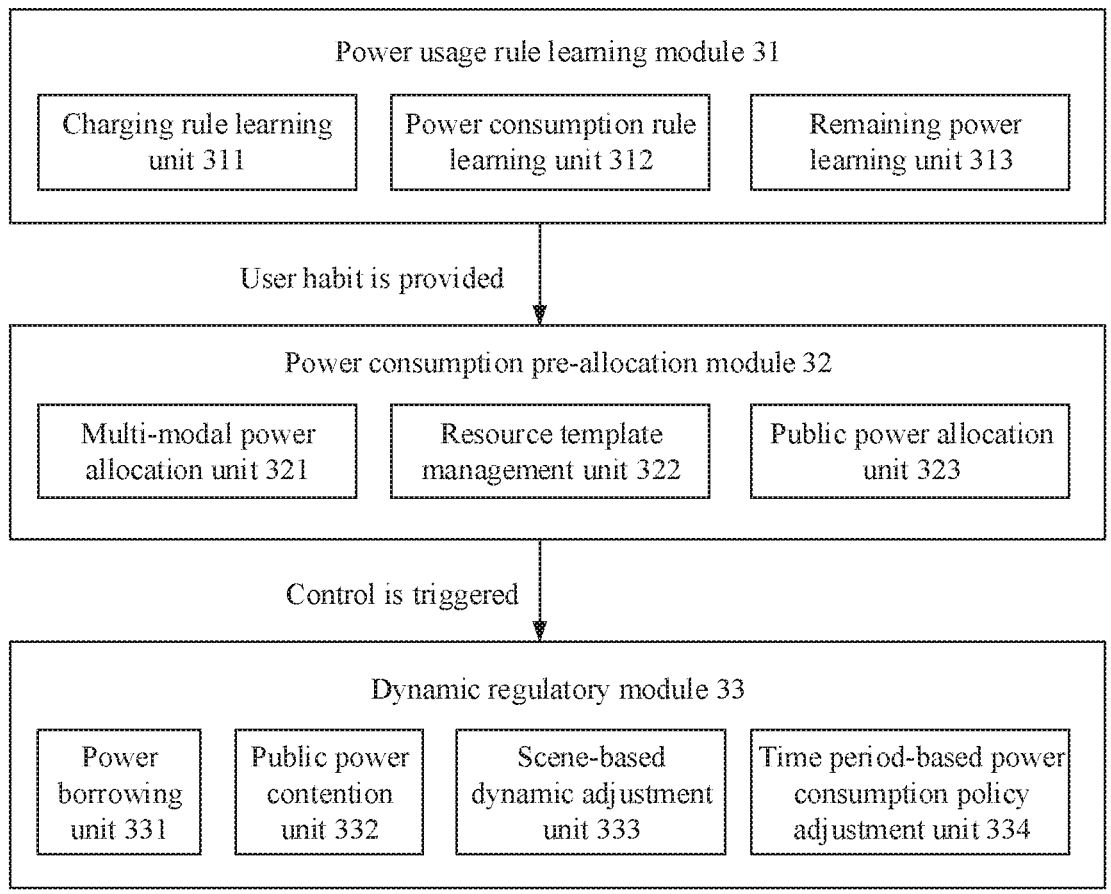
FIG. 3 is a schematic function diagram of a battery management service according to an embodiment of the present invention.

A main improvement in this application is adding a battery management service 223. The battery management service 223 may be deployed at a kernel library layer 230, or may be deployed at a framework layer 220. FIG. 2 is a schematic diagram in which that the battery management service 223 is deployed at the framework layer 220 is used as an example. A user of the battery management service 223 maintains a policy, an algorithm, and data that are related to battery power usage. Optionally, for ease of understanding, FIG. 3 is used herein to show some function modules (or functions) included in the battery management service 223. From an overall perspective, the battery management service 223 includes a power usage rule learning module 31, a power consumption pre-allocation module 32, and a dynamic regulatory module 33.

The power usage rule learning module 31 may further be divided into a charging rule learning unit 311, a power consumption rule learning unit 312, and a remaining power learning unit 313 based on functions. The charging rule learning unit 311 is configured to learn a charging rule of the terminal based on a historical record of using the battery by the terminal, the power consumption rule learning unit 312 is configured to learn a power consumption rule of each application or within each time period of the terminal based on the historical record of using the battery by the terminal, and the remaining power learning unit 313 is configured to learn, based on the historical record of using the battery by the terminal, a power remaining rule when the battery is being charged.

The power consumption pre-allocation module 32 may further be divided into a multi-modal power allocation unit 321, a resource template management unit 322, and a public power allocation unit 323 based on functions. The multi-modal power allocation unit 321 is configured to plan power based on an object (each object is one application or one type of application) or based on a time period, the resource template management unit 322 is configured to select an appropriate resource template based on a requirement to properly control a power consumption speed, and the public power allocation unit 323 is configured to reserve a specific amount of public power in advance to cope with unexpected power usage.

The dynamic regulatory module 33 may further be divided into a power borrowing unit 331, a public power contention unit 332, a scene-based dynamic adjustment unit 333, and a time period-based power consumption policy adjustment unit 334 based on functions. The power borrowing unit 331 is configured to: when power of an object (each object is one application or one type of application) is insufficient or is to be insufficient, borrow power that is from another object and that is to be used by the object. The public power contention unit 332 is configured to: when power of an object is insufficient or is to be insufficient, allocate a part of reserve public power that is to be used by the object in combination with power usage of another object; the scene-based dynamic adjustment unit 333 is configured to dynamically allocate, based on a scenario of the terminal, a resource template that matches the scenario, to properly control a power consumption speed; and the time period-based power consumption policy adjustment unit 334 is configured to dynamically adjust, with reference to a power consumption status within a current time period, a resource template used for power consumption within a next time period, so as to properly control a power consumption speed.

Figure 4:
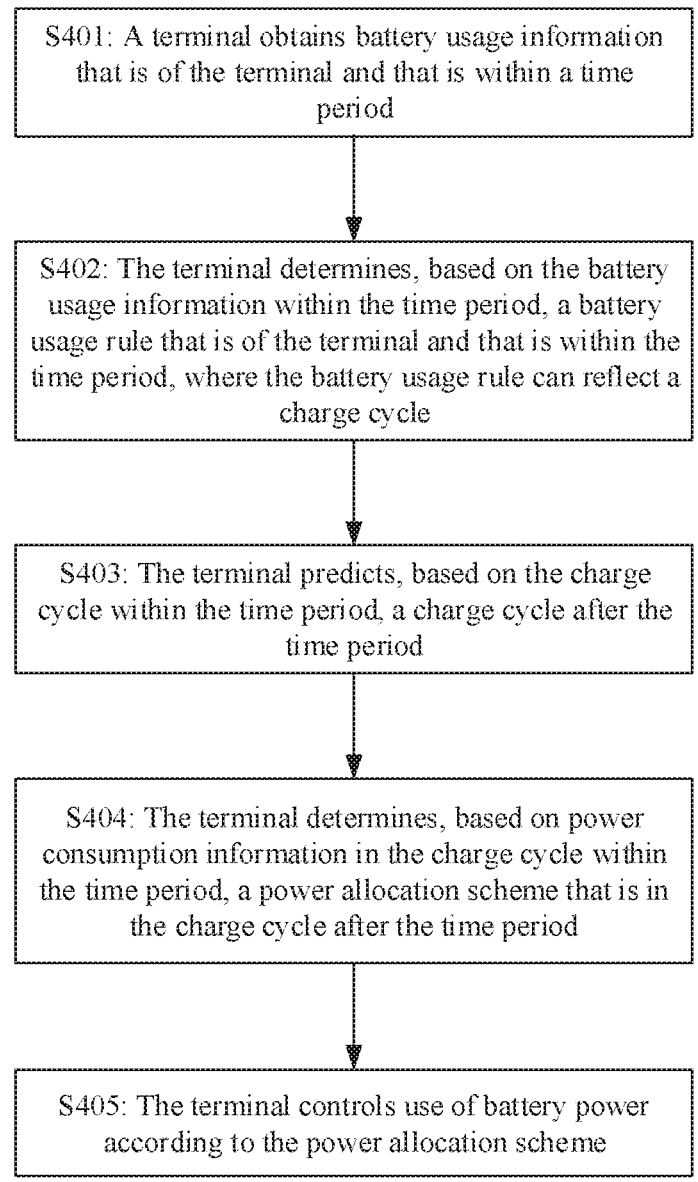
FIG. 4 is a schematic flowchart of a power control method based on a user habit according to an embodiment of the present invention.

FIG. 4 shows a power control method based on a user habit according to an embodiment of this application. The method may be implemented based on the terminal shown in FIG. 1 or FIG. 2 or a terminal of another structure. The method includes but is not limited to the following steps.

Step S401: The terminal obtains battery usage information that is of the terminal and that is within a time period.

The battery usage information is some information about use of a battery. For example, the battery usage information may include a start moment of battery charging, an end moment of battery charging, power at the start moment of battery charging a battery charging place, and power usage of the battery. The battery power usage may include a use time and average power consumption of each application, a use time and average power consumption of each type of application, and the like. How to use the listed information is described below. In addition, the battery usage information may be stored in a terminal database, for example, stored in a database protected based on a se-linux security mechanism, so that the terminal can invoke the battery usage information from the database when needed. The battery usage information may alternatively be stored in a cloud server.

Step S402: The terminal determines, based on the battery usage information within the time period, a battery usage rule that is of the terminal and that is within the time period, where the battery usage rule can reflect a charge cycle.

The battery usage rule may include one or more of a charging rule, a power remaining rule, and a power usage rule. The following separately describes manners of determining the charging rule, the power remaining rule, and the power usage rule.

Charging rule: The terminal may determine a charge cycle based on the start moment of battery charging and/or the end moment of battery charging. The charge cycle has at least the following several possible definitions: 1. a time interval from an end time of current charging to a start time of next charging, 2. a time interval from the end time of current charging to an end time of next charging, 3. a time interval from a start time of current charging to the start time of next charging, and 4. a time interval from the start time of current charging to the end time of next charging. Herein, the end moment of charging and the start moment of charging are accurate to milliseconds, seconds, minutes, 10 minutes, or another time granularity. A specific accurate value may be set based on an actual requirement. The following describes, by using the possible definition 1 as an example, how to determine the charge cycle. Details are as follows.

It is assumed that the time period is just the past week, and during the week, charging starts at 10:00 pm on Monday and ends at 7:00 am on Tuesday, another time of changing starts at 10:00 pm on Tuesday and ends at 7:00 am on Wednesday, another time of charging starts at 10:00 pm on Wednesday and ends at 7:00 am on Thursday, another time of charging starts at 10:00 pm on Thursday and ends at 7:00 am on Friday, and another time of charging starts at 10:00 pm on Friday and ends at 7:00 am on Saturday. In this case, in a first aspect, it may be considered that 7:00 am to 10:00 pm every day during the week is one charge cycle; and in a second aspect, it may be considered that a time length of each charge cycle during the week is approximately 15 hours. Time segments approximately included in each charge cycle within the time period may be learned from the first aspect. Optionally, a time node at which a start moment of a charge cycle within the time period is approximately located may be determined by calculating an average value (or a standard deviation) of start moments of all charge cycles within the time period, a time node at which an end moment of the charge cycle within the time period is approximately located may be determined by calculating an average value (or a standard deviation) of end moments of all the charge cycles within the time period, and a time interval to which the charge cycle within the time period approximately belongs may be learned based on the time node at which the start moment is approximately located and the time node at which the end moment is approximately located. An approximate length of the charge cycle within the time period may be learned from the second aspect. Optionally, the approximate length of the charge cycle within the time period may be determined by calculating an average value (or a standard deviation) of lengths of all the charge cycles within the time period.

Besides the foregoing, the terminal may obtain, by analyzing based on the start moment of battery charging and the end moment of battery charging within the time period, a common charging time segment of a user. In addition, the terminal may obtain (for example, obtain through positioning) a place at which the battery is charged within the time period, and collect information such as a quantity of charging times and a charging frequency at each place, to determine a common charging place. For example, the determined common charging place may be home or an office.

Power remaining rule: The terminal may obtain, by analyzing based on power at the start moments of battery charging in all the charge cycles within the time period, how much power is usually left before the battery is charged in the charge cycle within the time period. Optionally, an average value (or a standard deviation) of power at the start moments of battery charging in all the charge cycles is used as power usually left before the battery is charged in the charge cycle within the time period. For example, it is assumed that the time period includes three charge cycles: a charge cycle 1, a charge cycle 2, and a charge cycle 3, and remaining power is 10% when the battery starts to be charged in the charge cycle 1, remaining power is 9.4% when the battery starts to be charged in the charge cycle 2, and remaining power is 10.6% when the battery starts to be charged in the charge cycle 3. In this case, the terminal may calculate an average value of the three values, namely, (10%+9.4%+10.6%)/3=10%. In this way, it may be considered that 10% power is usually left before the battery is charged in the charge cycle within the time period.

Power usage rule: The power usage rule is analyzed from a perspective of an application or from a perspective of a time period. Details are as follows.

In a case 1, the terminal may obtain, by analyzing based on the battery power usage recorded in the battery usage information, usual power overheads in all the time segments in the charge cycle within the time period. There are many time segment division criteria. For example, using one hour as a division unit, 00:00 to 01:00 is one time segment, 01:00 to 02:00 is one time segment, 02:00 to 03:00 is one time segment, and so on. For another example, using two hours as a division unit, 06:00 to 08:00 is one time segment, 08:00 to 10:00 is one time segment, 10:00 to 12:00 is one time segment, and so on. For another example, early morning, morning, noon, afternoon, evening, and midnight that are of every day are each one time segment.

For example, it is assumed that the time period includes four charge cycles: a charge cycle 1, a charge cycle 2, a charge cycle 3, and a charge cycle 4. and each charge cycle includes time segments such as morning, noon, afternoon, and evening. In the charge cycle 1, power consumed in the morning is 200 mA, power consumed at noon is 100 mA, power consumed in the afternoon is 300 mA, and power consumed in the evening is 500 mA; in the charge cycle 2, power consumed in the morning is 180 mA, power consumed at noon is 90 mA, power consumed in the afternoon is 280 mA, and power consumed in the evening is 490 mA; in the charge cycle 3, power consumed in the morning is 210 mA, power consumed at noon is 106 mA, power consumed in the afternoon is 298 mA, and power consumed in the evening is 460 mA; and in the charge cycle 4, power consumed in the morning is 200 mA, power consumed at noon is 110 mA, power consumed in the afternoon is 310 mA, and power consumed in the evening is 510 mA. In this case, it may be considered that power usually consumed in the mornings in the charge cycle within the time period is an average value of the power consumed in the morning in the charge cycle 1, the power consumed in the morning in the charge cycle 2, the power consumed in the morning in the charge cycle 3, and the power consumed in the morning in the charge cycle 4 (certainly, another calculation manner may alternatively be used). To be specific, the power usually consumed in the mornings in the charge cycle within the time period is (200+180+210+200)/4=197.5 mA. According to the same principle, power usually consumed at noon in the charge cycle over the period of time is obtained as (100+90+106+110)/4=101.5 mA, power usually consumed in the afternoons in the charge cycle within the time period is obtained as (300+280+298+310)/4=297 mA, and power usually consumed in the evenings in the charge cycle within the time period is obtained as (500+490+460+510)/4=490 mA.

In a case 2, the terminal may obtain, by analyzing based on the battery power usage recorded in the battery usage information, usual power overheads of each object that is in the charge cycle within the time period. Each object is one application or one type of application. For example, a game application, a video application, an office application, a social application, a live broadcast application, and the like are different applications.

For example, it is assumed that the time period includes three charging cycles: a charge cycle 1, a charge cycle 2, a charge cycle 3, and a charge cycle 4; and each object is one type of application and types of applications that can be run on the terminal include a game application, a video application, an office application, a social application, and the like. In the charge cycle 1, power consumed by the game application is 500 mA, power consumed by the video application is 300 mA, power consumed by the office application is 300 mA, and power consumed by the social application is 100 mA; in the charge cycle 2, power consumed by the game application is 600 mA, power consumed by the video application is 400 mA, power consumed by the office application is 250 mA, and power consumed by the social application is 70 mA; in the charge cycle 3, power consumed by the game application is 540 mA, power consumed by the video application is 350 mA, power consumed by the office application is 280 mA, and power consumed by the social application is 90 mA; and in the charge cycle 4, power consumed by the game application is 510 mA, power consumed by the video application is 330 mA, power consumed by the office application is 220 mA, and power consumed by the social application is 92 mA. In this case, it may be considered that power usually consumed by the game application in the charge cycle within the time period is an average value of the power consumed by the game application in the charge cycle 1, the power consumed by the game application in the charge cycle 2, the power consumed by the game application in the charge cycle 3, and the power consumed by the game application in the charge cycle 4 (certainly, another calculation manner may also be used). To be specific, the power usually consumed by the game application in the charge cycle within the time period is (500+600+540+510)/4=537.5 mA. According to the same principle, power usually consumed by the video application in the charge cycle within the time period is obtained as (300+400+350+330)/4=345 mA, power usually consumed by the office application in the charge cycle within the time period is obtained as (300+250+280+220)/4=262.5 mA, and power consumed by the social application in the charge cycle over the period of time is obtained as (100+70+90+92)/4=88 mA.

Optionally, the battery usage information further records power consumption information of some hardware of the terminal, for example, records power consumption information of a display screen when the display screen is locked. Correspondingly, the terminal (evenly or unevenly) allocates power consumption of the some hardware to each object by using a specific algorithm, as a part of power consumption of each object in a charge cycle. A reason for doing this is that the power consumption of the some hardware belongs to public overheads and does not belong to power overheads of a specific object. If the power consumption of the some hardware is allocated to an object, or the power consumption of the some hardware is not considered during power allocation, power is allocated inappropriately.

The foregoing describes the battery usage rule that is in the charge cycle within the time period. The following describes how to determine, according to the battery usage rule in the charge cycle within the time period, a power allocation scheme that is in the charge cycle after the time period.

Step S403: The terminal predicts, based on the charge cycle within the time period, a charge cycle after the time period.

From the time segments that are approximately included in the charge cycle within the time period and that are obtained through summarization according to the "charging rule", it may approximately be deduced which time interval after the time period is a charge cycle. In other words, one or more charge cycles after the time period are determined. For example, if each charge cycle within the time period is approximately from 10:00 pm on a current day to 10:00 pm on a next day, it may be deduced that 10:00 pm every day to 10:00 pm on a next day after the time period is also a charge cycle.

Optionally, based on the approximate length that is of the charge cycle within the time period and that is obtained through summarization according to the "charging rule" and a start moment of battery charging after the time period, it may be deduced which time interval after the time period is a charge cycle. In other words, a charge cycle after the time period is obtained. For example, the approximate length of the charge cycle within the time period is 24 hours, and the terminal detects, at 10:00 pm on a day after the time period, an operation of starting to charge the battery. In this case, it may be deduced that 10:00 pm on the day to 10:00 pm on a next day is one charge cycle after the time period.

In the foregoing descriptions, both the charge cycle within the time period and the charge cycle after the time period are determined according to the battery charging rule. In practice, the charge cycle within the time period and the charge cycle after the time period may alternatively be preset manually, and are obtained without analyzing the charging rule. For example, 10:00 pm every day to 10:00 pm on a next day is manually set to one charge cycle. For another example, it is manually set that starting from a moment, every 12 hours is one charge cycle. Other manually setting manners are not listed herein one by one.

Step S404: The terminal determines, based on power consumption information in the charge cycle within the time period, a power allocation scheme that is in the charge cycle after the time period.

The power allocation scheme in the charge cycle after the time period is determined after the charge cycle after the time period is determined. There are a plurality of possibilities for total power allocated in the power allocation scheme. For example, the total power allocated in the power allocation scheme is remaining battery power when the power allocation scheme is determined. For another example, when the battery usage rule determined above based on the battery usage information includes the power remaining rule, the total power allocated in the power allocation scheme is equal to a difference between remaining battery power when the power allocation scheme is determined and reserve power. The reserve power is calculated based on remaining battery power reflected according to the power remaining rule.

For example, if the power remaining rule indicates that the remaining battery power is approximately 100 mA when charging starts in the charge cycle within the time period, it is deduced that when each charge cycle ends, 100 mA power approximately needs to be reserved as the reserve power, and the reserve power may be usually used for emergency. Then, when available power is allocated to the charge cycle after the time period, the 100 mA reserve power is first subtracted from the remaining battery power when the terminal determines the power allocation scheme, and then power obtained through subtracting is allocated to obtain the power allocation scheme.

Under the premise of the case 1, the determining, by the terminal based on the battery usage information, a power allocation scheme that is of the terminal and that is in the charge cycle after the time period may be: determining, by the terminal based on usual power overheads in each time segment in the charge cycle within the time period, available power that is of the terminal and that is in each of a plurality of time segments in the charge cycle after the time period.

Optionally, the available power of the terminal in each of the plurality of time segments in the charge cycle after the time period is in a one-to-one correspondence with, equal to, or close to the usual power overheads of the terminal in each time segment in the charge cycle within the time period (for example, a value calculated by using an algorithm such as rounding off or rounding). For example, if the charge cycle within the time period includes time segments such as morning, noon, and afternoon; and power consumed in the morning in the charge cycle within the time period is 400 mA (hA), power consumed at noon is 300 mA (hA), and power consumed in the afternoon is 1000 mA (hA), 400 mA (hA) power may be allocated to the morning in the charge cycle after the time period, 300 mA (hA) power may be allocated to the noon in the charge cycle after the time period, and 1000 mA (hA) power may be allocated to the afternoon in the charge cycle after the time period.

Optionally, a ratio of available power of the terminal in all of a plurality of time segments in the charge cycle after the time period is equal to or close to a ratio of usual power overheads of the terminal in all time segments in the charge cycle within the time period (for example, a value calculated by using an algorithm such as rounding off or rounding). For example, it is assumed that the charge cycle within the time period includes time segments such as morning, noon, and afternoon; power consumed in the morning in the charge cycle within the time period is 400 mA (hA), power consumed at noon is 300 mA (hA), and power consumed in the afternoon is 1000 mA (hA); and a ratio of power overheads in the morning, at noon, and in the afternoon is 4:3:10. In this case, power may be allocated to the morning, the noon, and the afternoon in the charge cycle after the time period based on the ratio 4:3:10. For example, 600 mA (hA) power is allocated to the morning in the charge cycle after the time period, 450 mA (hA) power is allocated to the noon in the charge cycle after the time period, and 1500 mA (hA) power is allocated to the afternoon in the charge cycle after the time period.

In addition, time segments that are in the charge cycle within the time period and in which the user uses the terminal for a comparatively long time are considered as important time segments. Therefore, partial power may be additionally allocated after power is allocated according to the foregoing rules, to ensure that more sufficient power can be used in these important time segments. For example, the time segments include early morning, morning, noon, afternoon, evening, and midnight. The terminal calculates use duration of the user in each time segment. If a ratio of use duration of a time segment to use duration of all time segments is less than 3%, the time segment is considered as a low-probability time segment, and power is not allocated to the low-probability time segment. If a ratio of use duration of a time segment to use duration of all time segments is greater than 25%, the time segment is an important time segment. If a ratio of use duration of a time segment to use duration of all time segments is less than 10%, the time segment is an unimportant time segment. Power needs to be allocated to the important time period and the unimportant time period in the foregoing manner. In addition, after the power is allocated to the unimportant time period and the important time period in the foregoing manner, 10% power is additionally increased for the important time period, and 10% power is reduced for the unimportant time period.

Under the premise of the case 2, the determining, by the terminal based on the battery usage information, a power allocation scheme that is of the terminal and that is in the charge cycle after the time period may be: determining, by the terminal based on the usual power overheads of each object in the charge cycle within the time period, available power that is of each object of the terminal and that is in the charge cycle after the time period.

Optionally, the available power of each object the terminal in the charge cycle after the time period is in a one-to-one correspondence with, equal to, or close to the usual power overheads of each object of the terminal in the charge cycle within the time period (for example, a value calculated by using an algorithm such as rounding off or rounding). For example, if applications installed (or pre-configured) on the terminal include the game application, the video application, and the social application, and power overheads of the game application, the video application, and the social application in the charge cycle within the time period are respectively 300 mA (hA), 200 mA (hA), and 100 mA (hA), available power allocated to the game application, the video application, and the social application that run in the charge cycle after the time period may be 300 mA (hA), 200 mA (hA), and 100 mA (hA), respectively.

Optionally, a ratio of the available power of all the objects of the terminal in the charge cycle after the time period is in a one-to-one correspondence with, equal to, or close to a ratio of the power overheads of all the objects of the terminal in the charge cycle within the time period (for example, a value calculated by using an algorithm such as rounding off or rounding). For example, if applications installed (or pre-configured) on the terminal include the game application, the video application, and the social application, power overheads of the game application, the video application, and the social application in the charge cycle within the time period are 300 mA (hA), 200 mA (hA), and 100 mA (hA), respectively, and a ratio of the power overheads of the game application, the video application, and the social application in the charge cycle within the time period is 3:2:1, available power allocated to the game application, the video application, and the social application running in the charge cycle after the time period may be respectively 450 mA (hA), 300 mA (hA), and 150 mA (hA), and a ratio of power overheads of the game application, the video application, and the social application in the charge cycle after the time period is also 3:2:1 .

In addition, an object that is frequently used, used for a relatively long time, or specially marked by the user in the charge cycle within the time period may be considered as an important object. Therefore, partial power may additionally be allocated after power is allocated based on the foregoing rule, to ensure that sufficient power can be used for the important object. The following provides descriptions by using an example.

If each object is one type of application, a usual quantity of times of using each type of application in the charge cycle within the time period are collected in this embodiment of this application. If a ratio of a quantity of times of using one type of application to a quantity of times of using all types of applications is less than 3%, the type of application is considered as a low-probability type of application, and power is not allocated to the low-probability type of application. If a ratio of a usual quantity of times of using one type of application to a quantity of times of using all types of applications is greater than 20%, the type of application is considered as an important type of application. If a ratio of a usual quantity of times of using one type of application to a quantity of times of using all types of applications is less than 10%, the type of application is considered as an unimportant type of application. Power needs to be allocated to the important type of application and the unimportant type of application. In addition, after the power is allocated to the unimportant type of application and the important type of application in the foregoing manner, 10% of the power allocated to the important application is further increased for the important type of application, and 10% of the power allocated to the unimportant application type of application is decreased for the unimportant type of application.

If each object is one application, usual quantities of times of using all applications in the charge cycle within the time period are collected in this embodiment of this application. If a ratio of a usual quantity of times of using an application to the usual quantities of times of using all the applications is less than 3%, the application is considered as a low-probability application, and power is not allocated to the low-probability application. If a ratio of a usual quantity of times of using an application to the usual quantities of times of using all the applications is greater than 20%, the application is considered as an important application. If a ratio of a usual quantity of times of using an application to the usual quantities of times of using all the applications is less than 10%, the application is considered as an unimportant application. Power needs to be allocated to the important application and the unimportant application in the foregoing manner. In addition, after the power is allocated to the unimportant application and the important application in the foregoing manner, 10% power is further increased for the important application, and 100% power is decreased for the unimportant application.

Step S405: The terminal controls use of battery power according to the power allocation scheme.

In a case, if the power allocation scheme indicates available power in each of a plurality of time segments, the terminal uses power in each of the plurality of time segments according to regulations. For example, if the power allocation scheme indicates that available power is 400 mA in the morning, 300 mA at noon, and 1000 mA in the afternoon that are in the charge cycle after the time period, the terminal uses 400 mA power in the morning in the charge cycle after the time period, uses 300 mA power at noon in the charge cycle after the time period, and uses 1000 mA power in the afternoon in the charge cycle. In another case, if the power allocation scheme indicates available power of each of a plurality of objects, each of the plurality of objects of the terminal uses power according to regulations. For example, if the power allocation scheme indicates that available power that is of the game application, the video application, and the social application in the charge cycle and that is after the time period is 400 mA, 300 mA, and 1000 mA, respectively, the game application uses 400 mA power in the charge cycle after the time period, the video application uses 300 mA power in the charge cycle after the time period, and the social application uses 1000 mA power in the charge cycle after the time period.

Based on the foregoing solution, more optional implementation solutions may further be provided. The following provides descriptions by using an example.

Optional solution 1: Under the premise of the foregoing case 2, the power allocation scheme further indicates backup public power. The controlling, by the terminal, use of battery power according to the power allocation scheme may include: if remaining power obtained after power allocated to a target object in the plurality of objects is used is less than a preset value, contending for (or obtaining), by the terminal according to a first preset rule, partial power that is from the public power and that is to be used by the target object. Optionally, the power contended for the target object may be considered based on one or more of a probability that the target object is subsequently used, a requirement on hardware such as a CPU when the target object runs, importance of the target object (for example, the importance may be determined by using a use frequency and use duration), and a current application scene of the target object. For example, the power that the terminal contends for the target object may be calculated according to a formula 1-1. The formula 1-1 is as follows:

$$p_{earn}^i = p_{pub} * \frac{w^i(Prob, Perfor, Import, Scene)}{\sum_{j=0}^{j=J} w^j(Prob, Perfor, Import, Scene)}$$

The terminal includes a total of J objects, $w^j$ (Prob, Perfor, Import, Scene) represents a weight factor of the $j^{th}$ object in the J objects, and $w^j$ (Prob, Perfor, Import Scene) is obtained by analyzing, based on a probability Prob that the $j^{th}$ object is subsequently used, a requirement Perfor on hardware such as a CPU when the $j^{th}$ object runs, importance Import of the $j^{th}$ object, and a current application scene of the $j^{th}$ object. In addition, $w^i$ (Prob, Perfor, Import, Scene) represents a weight factor of the target object in the J objects, $p_{pub}$ represents remaining public power, and $p_{earn}^i$ represents the power contended for the target object.

The probability that the target object is subsequently used may be calculated based on a track of using an application by the user. For example, the power usage information includes track information of using an object by the user, and the track information records when an application is used, which application is used before and after a specific application is used, and the like. Therefore, the probability that the target object is subsequently used may be calculated at any moment based on the moment and an application that is being used at the moment. Different scenes usually have different impact on power contention for a same object, and a same scene usually has different impact on power contention for different objects. For example, in an office scene, a weight factor of the $1^{st}$ object in the J objects is $w^1$ (0.8, 0.85, 0.95, 0.9), and a weight factor of a $2^{nd}$ object in the J objects is $w^2$ (0.8, 0.85, 0.95, 0.8); or in a traveling scene, a weight factor of the $1^{st}$ object in the J objects is $w^1$ (0.8, 0.85, 0.95, 0.3), and a weight factor of a $2^{nd}$ object in the J objects is $w^2$ (0.8, 0.85, 0.95, 0.4).

In addition, the public power may be allocated by a fixed power value or a fixed ratio. For example, 100 mA power or 20% of the battery power is allocated in each charge cycle as the public power. The public power may be varied according to a rule, and may be different in different charge cycles. For example, if terminal usage in one or more charge cycles is more regular, less public power may be allocated, because in the regular usage case, a case of a large amount of sudden power consumption usually occurs rarely, and it is unnecessary to allocate much public power. On the contrary, if terminal usage in one or more charge cycles is irregular, more public power may be allocated, because in the irregular usage case, a case of a large amount of sudden power consumption may occur likely, and the power may be insufficient when less public power is allocated.

Figure 5:
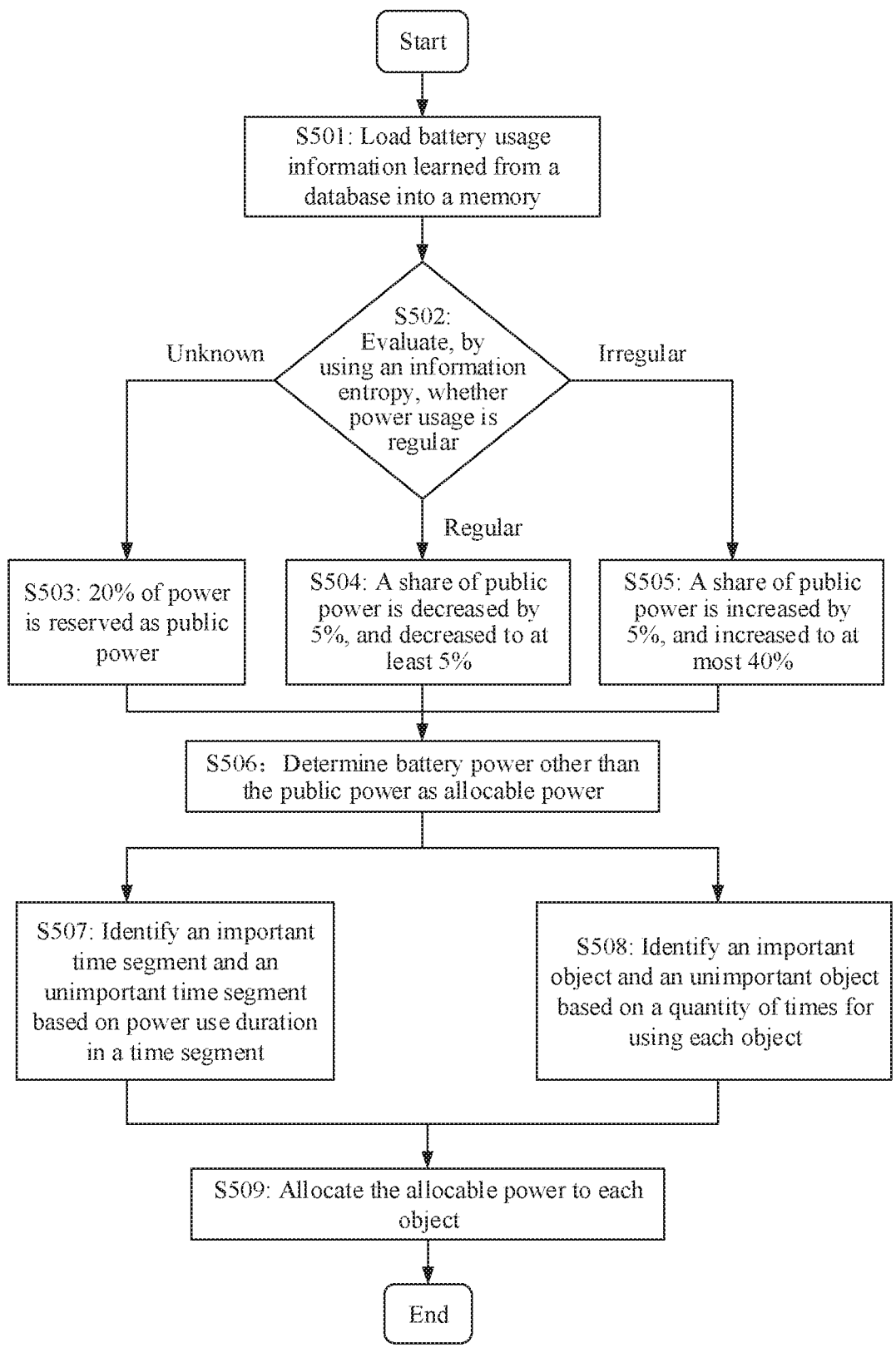
FIG. 5 is a schematic flowchart of still another power control method based on a user habit according to an embodiment of the present invention.

For example, as shown in FIG. 5, the terminal loads battery usage information learned from a database into a memory (S501), and then evaluates, by calculating an information entropy used by an application in the last seven days, whether power usage of the terminal is regular (S502). If power usage of the terminal is regular, a share of public power should be decreased, the share is decreased by 5% each time it is determined that the terminal usage is regular, and decreased to at least 5% (S504). If the terminal usage is irregular, a share of public power should be increased, and the share is increased by 5% each time, and increased to at most 40% (S505). If it cannot be determined whether the terminal usage is regular (unknown), 20% of power is reserved as the public power (S503). After the public power is obtained through adjustment in this manner, battery power other than the public power is determined as allocable power (S506). In addition, an important time segment and an unimportant time segment may further be identified based on power use duration in each time segment (S507). A time segment in which power use duration is longer (for example, the duration is greater than a preset time threshold or the duration is ranked top in a list) is an important time segment, while a time segment in which power use duration is shorter is an unimportant time segment. An important object and an unimportant object may further be identified based on a quantity of times for using each object (S508). An object used for a larger quantity of times (for example, the quantity of times is greater than a preset quantity of times or the quantity of times is ranked top in a list) is an important object, while an object used for a smaller quantity of times is an unimportant object. Then, how to allocate the allocable power is determined based on importance of a time segment or importance of an object (S509). For example, more power is allocated to a more important time segment, and less or no power is allocated to a less important time segment. For another example, more power is allocated to a more important object, and less or no power is allocated to a less important object.

Optional solution 2: Under the premise of the case 2, the controlling, by the terminal, use of battery power according to the power allocation scheme may include: if remaining power obtained after power allocated to a target object in the plurality of objects is used is less than a preset value, allocating, by the terminal according to a second preset rule, partial power that is from power allocated to another object and that is used by the target object. The another object is one or more objects in the plurality of objects except the target object. Optionally, how much power needs to be allocated (borrowed) from the power allocated to the another object and is to be used by the target object may be determined based on one or more of a probability that the target object is subsequently used (the manner of obtaining the parameter has been described above), a requirement on hardware such as a CPU when the target object runs, importance of the target object (for example, the importance may be determined by using a use frequency and use duration), and a current application scene of the target object. For example, the power that needs to be borrowed from the another object to the target object may be calculated according to formulas 1-2, 1-3, and 1-4. The formulas 1-2, 1-3, and 1-4 are as follows:

$$\text{s.t.} E_{a_i}^{need} = \sum_{a_p \in A} \Omega(a_p) * E_{a_p} \quad 1\text{-}2$$

$$\Omega(a_p) = \begin{cases} \dfrac{w^p\begin{pmatrix} Prob, Perfor, \\ Import, Scene \end{pmatrix}}{\sum_{k=0}^{k=K} w^k\begin{pmatrix} Prob, Perfor, \\ Import, Scene \end{pmatrix}}, & \text{if it is determined to borrow power} \\ 0, & \text{if it is determined not to be borrow the power} \end{cases} \quad 1\text{-}3$$

$$f = \sum_{a_p \in A} |S(X'_{a_p}) - S(X_{a_p})| \quad 1\text{-}4$$

In the formula 1-2, a set A includes objects in the plurality of objects except the target object, and the objects in the set A includes the $1^{st}$ object, the $2^{nd}$ object, . . . , the $(K-1)^{th}$ object and the $K^{th}$ object after being sorted according to a specific rule. $\text{s.t.} E_{a_i}^{need}$ represents power that the target object needs to borrow from an object in the set A, $\Omega(\alpha_p)$ represents a borrowing coefficient of the $p^{th}$ object in the set A, and $E_{\alpha_p}$ represents power allocated to the $p^{th}$ object.

In the formula 1-3, $w^i$ (Prob,Perfor,Import,Scene) represents a weight factor of the target object in the (K+1) objects that include the objects in the set A and the target object. The weight factor is obtained by analyzing, based on the probability Prob that the target object is subsequently used, the requirement Perfor on hardware such as a CPU when the target object runs, the importance Import of the target object, and the current application scene of the target object. In addition, $w^k$ (Prob, Perfor, Import, Scene) represents a weight factor of the $k^{th}$ (k is a positive integer from 1 to K) object in the set A in the (K+1) objects. For an obtaining manner, refer to the foregoing description of the weight factor of the target object.

In the formula 1-4, $S(X_{\alpha_p}')$ represents a performance score after power is borrowed from the $p^{th}$ object in the K objects, $S(X_{\alpha_p})$ represents a performance score before power is borrowed from the p object, and $|S(X_{\alpha_p}')-S(X_{\alpha_p})|$ is used to represent a performance score change before and after the power is borrowed from the $p^{th}$ object. Under the premise of ensuring that the formulas 1-2 and 1-3 hold true, a value of f in the formula 1-4 is minimized. In this case, a value of $\Omega(\alpha_p)*E_{\alpha_p}$ is the determined power borrowed from the $p^{th}$ object to the target object.

In this way, power that the target object needs to borrow from each of the other objects in the plurality of objects except the target object can be determined according to the foregoing formulas 1-2, 1-3, and 1-4.

Optional solution 3: The controlling, by the terminal, use of battery power according to the power allocation scheme includes: controlling, by the terminal, the use of the battery power by using a resource template that matches the power allocation scheme. The resource template is used to define a frequency or a frequency adjustment policy of one or more of a central processing unit CPU, a graphics processing unit GPU, or a double data rate synchronous dynamic random access memory DDR. Computing resource reduction or the frequency adjustment policy can effectively reduce power consumption costs, but can affect application performance, such as reducing a running speed or a display frame rate. In this embodiment of this application, a plurality of resource templates may be pre-configured for selection and use. A same application has different power consumption speeds when running different resource templates. Some resource templates have a comparatively low power consumption speed but poorer performance, and such resource templates are suitable for e-book reading, a social application based on text communication, and the like. Some resource templates have a higher power consumption speed but higher performance, and such resource templates are suitable for gaming, online live broadcasting, and the like. Optionally, the resource template used by the terminal when the charge cycle after the time period starts is a resource template having a moderate power consumption speed in the plurality of resource templates, or certainly, may be a resource template selected from the plurality of resource templates according to another rule.

The resource template may be changed as required in a power usage process. The following describes several possible adjustment manners.

In a manner 1, when the power allocation scheme indicates available power of each of a plurality of objects, the controlling, by the terminal, the use of the battery power by using a resource template that matches the power allocation scheme may include: if remaining power obtained after power allocated to a target object in the plurality of objects is used is less than a preset value, updating, by the terminal, the resource template. A power consumption speed of an updated resource template is lower than a power consumption speed of a to-be-updated resource template. The preset value herein may be a value representing power, or may be a ratio, and may be set as required. For example, if the power allocated to the target object is 50 mA and the preset value is 5 mA, the terminal updates the resource template when only 5 mA is left after 50 mA is used by the target object. Likewise, if power allocated to the target object is 50 mA and the preset value is 10%, the terminal updates the resource template when only 10% is left after 50 mA is used by the target object. Updating the resource template can reduce a power consumption speed when the target object runs, thereby prolonging running duration of the target object.

Optionally, the preset value may alternatively be set according to the foregoing power remaining rule. When the power remaining rule indicates that the usual remaining power is larger, the preset value may be set to a larger value. When the power remaining rule indicates that the usual remaining power is smaller, the preset value may be set to a smaller value.

In a manner 2, when the power allocation scheme indicates available power in each of a plurality of time segments, the controlling, by the terminal, the use of the battery power by using a resource template that matches the power allocation scheme may include: if a power consumption speed in a target time segment in the plurality of time segments is greater than a preset speed threshold, updating, by the terminal, the resource template. A power consumption speed of an updated resource template is lower than a power consumption speed of a to-be-updated resource template, and the updated resource template is used by the terminal in one or more time segments after the target time segment. The preset speed threshold herein may be set as required. It may be understood that limited power is consumed completely in a comparatively short time when a power consumption speed is high. Therefore, in this application, the resource template is replaced when a power consumption speed in the target time period is high, so that power consumption speeds in one or more time segments after the target time segment are reduced, thereby prolonging a battery life of the terminal. Which one of the plurality of time segments is the target time segment is not limited herein.

Optionally, the preset speed threshold may alternatively be set according to the foregoing power remaining rule. When the power remaining rule indicates that the usual remaining power is larger, the preset speed threshold may be set to a greater value; or when the power remaining rule indicates that the usual remaining power is smaller, the preset speed threshold may be set to a smaller value.

In a manner 3, the controlling, by the terminal, the use of the battery power by using a resource template that matches the power allocation scheme may include: if the terminal determines that a usage scene of the terminal is changed to a preset usage scene, updating, by the terminal, the resource template. The updated resource template is a resource template corresponding to the preset usage scene, and correspondences between a plurality of application scenes and a plurality of resource templates are prestored by the terminal. Scenes may be classified as required. For example, divided by region, homes, offices, traveling journeys, business trips, and the like are different scenes. In different scenes, power supply capabilities are different. For example, battery chargers are available in families of most users, and the terminal is charged in a timely manner even if power consumption of the terminal is fast. Battery chargers are available at the offices of some users, and there is a large probability of supplying power if power consumption is relatively fast. However, charging is basically impossible during a traveling journey and a business trip, and power supply is very limited even though a mobile power bank is carried. Therefore, in a home scene, the terminal may use a resource template having a higher power consumption speed; in an office scene, the terminal may use a resource template having a moderate power consumption speed; or in a traveling journey or business trip scene, the terminal may use a resource template having a comparatively low power consumption speed.

For example, if there are a resource template 1, a resource template 2, and a resource template 3 in the terminal, and a power consumption speed of the resource template 1 is greater than a power consumption speed of the resource template 2, and the power consumption speed of the resource template 2 is greater than a power consumption speed of the resource template 3. The resource template 1 is configured to correspond to the home scene, the resource template 2 is configured to correspond to the office scene, and the resource template 3 is configured to correspond to the traveling journey and business trip scenes. In a power consuming process, the terminal may also obtain a scene of the terminal in real time or at intervals. Optionally, the scene of the terminal may be determined by analyzing information (such as chat information and time information) in the terminal or through positioning. Then, the scene of the terminal is determined, and a resource template corresponding to the scene is used. For example, if it is determined that the terminal is at home, the terminal uses the resource template 1; if it is determined that the terminal is in the office, the terminal uses the resource template 2: or if it is determined that the terminal is in a traveling journey or a business trip, the terminal uses the resource template 3.

In addition, if the battery usage rule determined above based on the battery usage information includes the charging rule, a charging probability of the terminal at each time stamp or in each position may further be determined according to the charging rule. For example, if the charging rule indicates that the terminal is charged for a relatively large quantity of times at a time stamp 18:00 to 20:00 in the charge cycle within the time period, it may be estimated that a charging probability of the terminal at the time stamp 18:00 to 20:00 in the charge cycle after the time period is relatively high. The relatively high charging probability indicates that the terminal is supplied with power (charged) in a timely manner even if a power consumption speed is relatively high. Therefore, the terminal may use, at the time stamp 18:00 to 20:00, a resource template having a relatively high power consumption speed and also use, within a short time period (for example, 10 minutes) before the time stamp, the resource template having the relatively high power consumption speed. Likewise, if the charging rule indicates that the terminal is charged for a relatively large quantity of times in a position in the charge cycle within the time period, it may also be estimated that the terminal has a relatively high charging probability in the position in the charge cycle after the time period. The relatively high charging probability indicates that the terminal is supplied with power (charged) in a timely manner even if a power consumption speed of the terminal is relatively high. Therefore, the terminal may use a resource template having a relatively fast power consumption speed in or near the position. Likewise, if the charging rule information indicates that the terminal is charged at an interval of one hour between two times of charging in the charge cycle within the time period, it may also be estimated that the terminal is charged every one hour in the charge cycle after the time period. When it is estimated that a time that the terminal is charged in next time is very close (for example, within 10 minutes), a resource template with a relatively fast power consumption speed may be used.

It can be learned from the foregoing descriptions that there are many feasible dynamic adjustment solutions after power is planned according to the power allocation scheme. In this case, these solutions may also be correspondingly combined. For ease of understanding, the following describes two optional solutions as an example.

Figure 6:
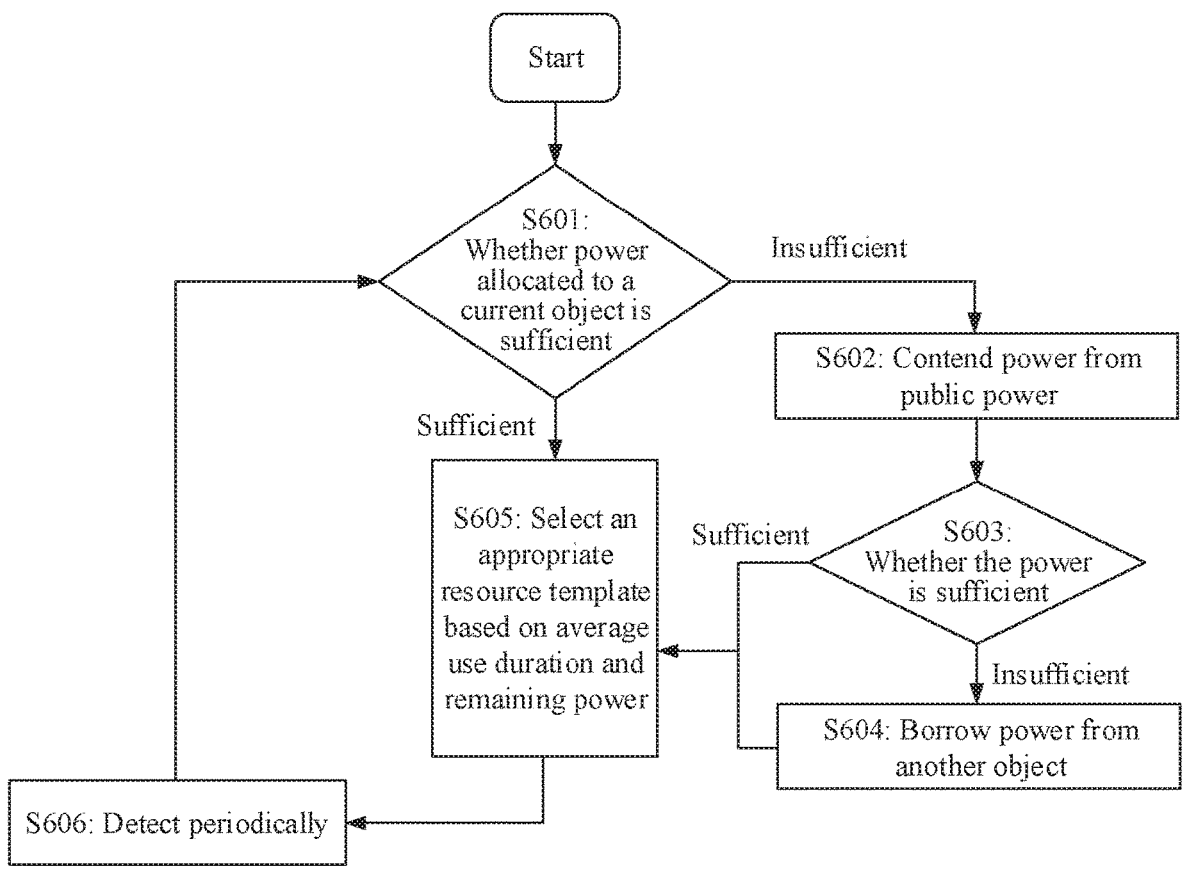
FIG. 6 is a schematic flowchart of still another power control method based on a user habit according to an embodiment of the present invention.

For example, as shown in FIG. 6, when power is allocated for different objects according to the power allocation scheme, whether power allocated to a current object is sufficient may be first determined (S601). If the power is sufficient, an appropriate resource template is selected based on average use duration and remaining power (S605). If the power is insufficient, power is contended from public power (S602), and then whether power obtained after contention is sufficient is determined (S603). If the power obtained through contention is sufficient, an appropriate resource template is selected based on average use duration and remaining power (S605). If the power obtained through contention is still insufficient, power is borrowed from another object (S604), and then an appropriate resource template is selected based on average use duration and remaining power after the power is borrowed (S605). One dynamic adjustment cycle is completed after the appropriate resource template is selected based on the average use duration and the remaining power, and subsequently, the foregoing procedure may be periodically performed (S606).

Figure 7:
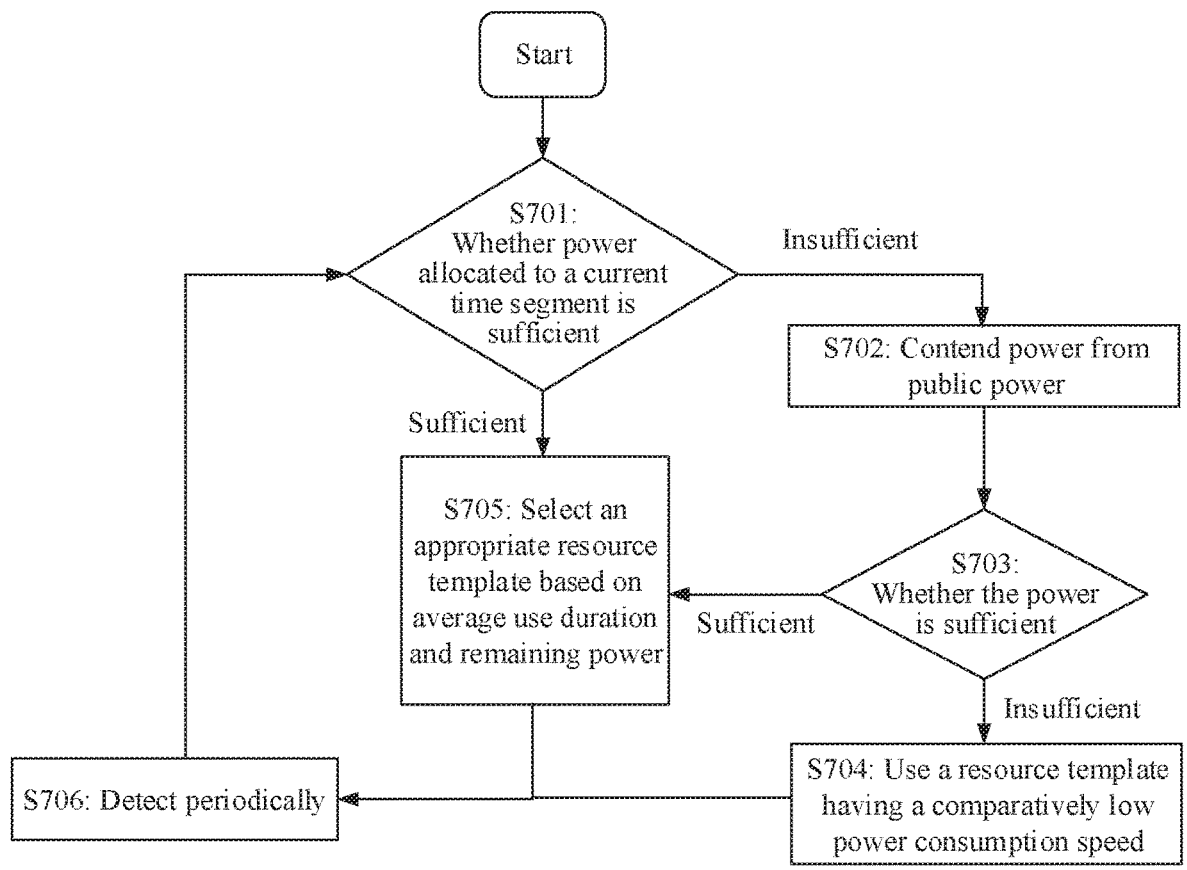
FIG. 7 is a schematic flowchart of still another power control method based on a user habit according to an embodiment of the present invention.

For another example, as shown in FIG. 7, when power is allocated for different time periods based on the power allocation scheme, whether power allocated in a current time segment is sufficient may be first determined (S701). If the power is sufficient, an appropriate resource template is selected based on average use duration and remaining power (S705). If the power is insufficient, power is contended from public power (S702), and then whether power obtained after contention is sufficient is determined (S703). If the power obtained after contention is sufficient, the appropriate resource template is selected based on the average use duration and the remaining power (S705). If the power obtained after contention is still insufficient, a resource template having more power consumption and a comparatively low power consumption speed (correspondingly having comparatively poor performance) is used (S704). One dynamic adjustment period is completed after a resource template is selected, and subsequently, the foregoing procedure may be periodically performed (S706).

In the method shown in FIG. 4, the terminal determines, according to a battery charging rule and power usage that are within a time period, a charge cycle within the time period and a power usage rule that is of each object or in each time segment in the charge cycle, and then power is also allocated in a charge cycle after the time period according to the determined rule, so that battery power of the terminal is used appropriately, thereby effectively prolonging a battery life of the terminal.

Figure 8:
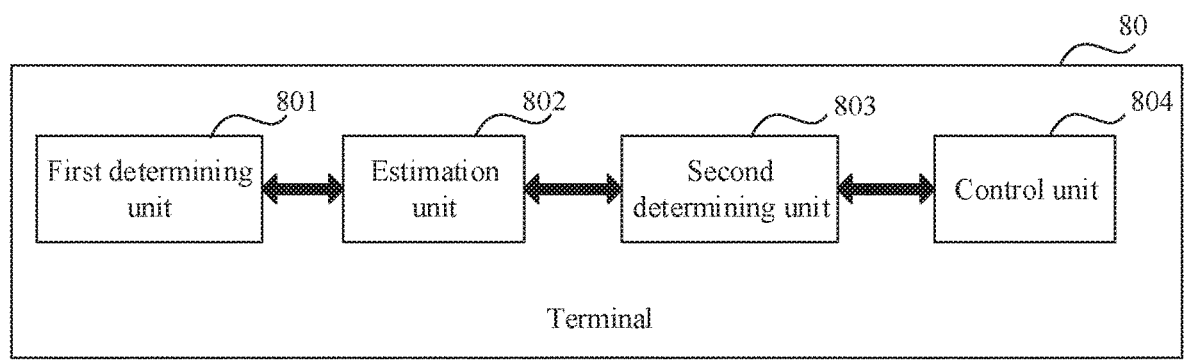
FIG. 8 is a schematic structural diagram of still another terminal according to an embodiment of the present invention.

The foregoing separately describes a terminal from a perspective of a hardware device and from a perspective of an operating system. In actual application, a structure of the terminal is also described by using a functional module. To help a person skilled in the art better understand an idea of this application, as shown in FIG. 8, an embodiment of this application further provides a terminal 80 presented from a perspective of a function module. The terminal 80 includes:

a first determining unit 801, configured to determine a charge cycle within a time period based on a charge status within the time period, where the charge cycle is a time from an end time of current charging to a start time of next charging, the charge cycle is a time from an end time of current charging to an end time of next charging, the charge cycle is a time from a start time of current charging to a start time of next charging, or the charge cycle is a time from a start time of current charging to an end time of next charging;

an estimation unit 802, configured to predict, based on the charge cycle within the time period, a charge cycle after the time period;

a second determining unit 803, configured to determine, based on power consumption information in the charge cycle within the time period, a power allocation scheme in the charge cycle after the time period, where the power allocation scheme indicates available power in each of a plurality of time segments, or indicates available power of each of a plurality of objects, and each object is one application or one type of application; and a control unit 804, configured to control use of a battery power according to the power allocation scheme.

In the foregoing method, the terminal may automatically obtain, by analyzing, a charge cycle within a time period based on a charging start moment and a charging end moment; then estimate, based on the charge cycle within the time period, a charge cycle that may exist after the time period; and further plan power for the estimated charge cycle after the time period according to a power usage rule in the charge cycle within the time period, so that battery power of the terminal is used in a balanced and appropriate manner, thereby effectively prolonging a battery life of the terminal. In addition, the charge cycle within the time period and the charge cycle after the time period are obtained by the terminal by automatically analyzing, and manually setting is not required, providing better user experience.

In a possible implementation, if the power allocation scheme indicates available power of each of a plurality of objects, the power allocation scheme further indicates backup public power; and the controlling, by the control unit 804, use of battery power according to the power allocation scheme may include: if remaining power obtained after power allocated to a target object in the plurality of objects is used is less than a preset value, obtaining, according to a first preset rule, partial power that is from the public power and that is to be used by the target object. In other words, in this embodiment of this application, partial public power is further reserved in a power planning process, and when power usage is inconsistent with expected power usage when exceptions occur (especially when the planned power is insufficient), partial power is contended from the public power for a corresponding time segment or object for use, to ensure that the terminal can be normally used when the exceptions occur.

In another possible implementation, if the power allocation scheme indicates available power of each of a plurality of objects, the controlling, by the control unit 804, use of battery power according to the power allocation scheme may include: if remaining power obtained after power allocated to a target object in the plurality of objects is used is less than a preset value, allocating, according to a second preset rule, partial power that is from power allocated to another object and that is to be used by the target object, where the another object is one or more objects in the plurality of objects except the target object. To be specific, there is a power borrowing mechanism between different objects. When remaining power of one of the objects is very little, power may be borrowed from another object in a timely manner according to a corresponding rule, to ensure normal use of the terminal.

In another possible implementation, the controlling, by the control unit 804, use of battery power according to the power allocation scheme is: controlling the use of the battery power by using a resource template that matches the power allocation scheme. The resource template is used to define a frequency or a frequency adjustment policy of one or more of a central processing unit CPU, a graphics processing unit GPU, or a double data rate synchronous dynamic random access memory DDR. The "matching" herein may be pre-configuring a default resource template (resource templates configured for different power allocation schemes may be the same or may be different). It may be understood that power consumption speeds of the different resource templates are different. Therefore, power usage is determined according to two factors: a power allocation scheme and a resource template, so that the power can be used more appropriately.

In another possible implementation, if the power allocation scheme indicates available power of each of a plurality of objects, the controlling, by the control unit 804, the use of the battery power by using a resource template that matches the power allocation scheme may include: if remaining power obtained after power allocated to a target object in the plurality of objects is used is less than a preset value, updating the resource template, where a power consumption speed of an updated resource template is lower than a power consumption speed of a to-be-updated resource template. To be specific, when it is found that the battery power of the terminal is used relatively fast, the resource template may be replaced in a timely manner. When a resource template having a comparatively low power consumption speed is used, a subsequent power consumption speed of the terminal may be reduced, thereby prolonging a battery life of the terminal.

In another possible implementation, if the power allocation scheme indicates available power in each of a plurality of time segments, the controlling, by the control unit 804, the use of the battery power by using a resource template that matches the power allocation scheme may include: if a power consumption speed in a target time segment in the plurality of time segments is greater than a preset speed threshold, updating the resource template, where a power consumption speed of an updated resource template is lower than a power consumption speed of a to-be-updated resource template, and the updated resource template is used by the terminal in one or more time segments after the target time segment. To be specific, when it is found that the battery power of the terminal is used relatively fast, the resource template may be replaced in a timely manner. When a resource template having a comparatively low power consumption speed is used, a subsequent power consumption speed of the terminal may be reduced, thereby prolonging a battery life of the terminal.

In another possible implementation, the controlling, by the control unit 804, the use of the battery power by using a resource template that matches the power allocation scheme may include: if the terminal determines that a usage scene of the terminal is changed to a preset usage scene, updating the resource template, where the updated resource template is a resource template corresponding to the preset usage scene, and correspondences between a plurality of application scenes and a plurality of resource templates are prestored by the terminal. It may be understood that the user has different power supply capabilities in different scenes. For example, a power supply capability at home is much stronger than a power supply capability in a traveling journey. Therefore, a user may be given a resource template with higher performance when the user uses the terminal at home. In this way, even if a power consumption speed of the resource template with higher performance is very high, power can be supplied in a timely manner after the power is drained, and normal use of the terminal is not affected.

For specific implementation and corresponding beneficial effects of the terminal 80, refer to the descriptions in the method embodiment shown in FIG. 4. Details are not described herein again.

An embodiment of the present invention further provides a chip system. The chip system includes at least one processor, a memory, and an interface circuit. The memory, the interface circuit, and the at least one processor are interconnected by using a line, and the at least one memory stores an instruction. When the instruction is executed by the processor, the method procedure shown in FIG. 4 is implemented.

An embodiment of the present invention further provides a computer-readable storage medium. The computer-readable storage medium stores a program instruction, and when the program instruction is run on a processor of a terminal, the method procedure shown in FIG. 4 is implemented.

An embodiment of the present invention further provides a computer program product. When the computer program product is run on a processor of a terminal, the method procedure shown in FIG. 4 is implemented.

It should be noted that division of modules or units provided in the foregoing embodiments is merely an example, and functions of the described modules are merely used as examples for description, and this application is not limited thereto. Persons of ordinary skill in the art may combine functions of two or more modules, or distribute a function of a module to obtain more modules of a finer granularity and in another deformation form according to a requirement. A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium includes: any medium that can store program code, such as a ROM or a random access memory (RAM), a magnetic disk or an optical disc.

What is claimed is:
1. A power control method, comprising:
    determining, by a terminal, a charge cycle within a time period based on a charge status within the time period, wherein the charge cycle is a time from an end time of current charging to a start time of next charging, the charge cycle is a time from an end time of current charging to an end time of next charging, the charge cycle is a time from a start time of current charging to a start time of next charging, or the charge cycle is a time from a start time of current charging to an end time of next charging;
    predicting, by the terminal and based on the charge cycle within the time period, a charge cycle after the time period;
    determining, by the terminal and based on power consumption information in the charge cycle within the time period, a power allocation scheme in the charge cycle after the time period, wherein the power allocation scheme indicates available power in each of a plurality of time segments, or indicates available power of each of a plurality of objects, and each object is one application or one type of application, wherein total power allocated in the power allocation scheme is equal to a difference between remaining battery power and reserve power, and wherein the remaining battery power is calculated based on a power remaining rule determined by the terminal for the charge cycle within the time period, and the reserve power represents power for emergency use; and
    controlling, by the terminal, use of battery power according to the power allocation scheme.
2. The method according to claim 1, wherein:
    if the power allocation scheme indicates available power in each of a plurality of time segments in the charge cycle after the time period, the power consumption information comprises power overheads in each of the plurality of time segments in the charge cycle within the time period; or
    if the power allocation scheme indicates available power of each of a plurality of objects, the power consumption information comprises power overheads of each of the objects in the charge cycle within the time period.
3. The method according to claim 1, wherein if the power allocation scheme indicates available power of each of a plurality of objects, the power allocation scheme further indicates backup public power, and the controlling, by the terminal, use of battery power according to the power allocation scheme comprises:
  if remaining power obtained after power allocated to a target object in the plurality of objects is used is less than a preset value, obtaining, by the terminal according to a first preset rule, partial power that is from the backup public power and that is to be used by the target object.

4. The method according to claim 1, wherein if the power allocation scheme indicates available power of each of a plurality of objects, the controlling, by the terminal, use of battery power according to the power allocation scheme comprises:
  if remaining power obtained after power allocated to a target object in the plurality of objects is used is less than a preset value, allocating, by the terminal according to a second preset rule, partial power that is from power allocated to another object and that is to be used by the target object, wherein the another object is one or more objects in the plurality of objects except the target object.

5. The method according to claim 1, wherein the controlling, by the terminal, use of battery power according to the power allocation scheme comprises:
  controlling, by the terminal, the use of the battery power by using a resource template that matches the power allocation scheme, wherein
  the resource template defines a frequency or a frequency adjustment policy of one or more of a central processing unit (CPU), a graphics processing unit (GPU), or a double data rate synchronous dynamic random access memory (DDR).

6. The method according to claim 5, wherein if the power allocation scheme indicates available power of each of a plurality of objects, the controlling, by the terminal, the use of the battery power by using a resource template that matches the power allocation scheme comprises:
  if remaining power obtained after power allocated to a target object in the plurality of objects is used is less than a preset value, updating, by the terminal, the resource template as an updated resource template, wherein a power consumption speed of the updated resource template is lower than a power consumption speed of a to-be-updated resource template.

7. The method according to claim 5, wherein if the power allocation scheme indicates available power in each of a plurality of time segments, the controlling, by the terminal, the use of the battery power by using a resource template that matches the power allocation scheme comprises:
  if a power consumption speed in a target time segment in the plurality of time segments is greater than a preset speed threshold, updating, by the terminal, the resource template as an updated resource template, wherein a power consumption speed of the updated resource template is lower than a power consumption speed of a to-be-updated resource template, and the updated resource template is used by the terminal in one or more time segments after the target time segment.

8. The method according to claim 5, wherein the controlling, by the terminal, the use of the battery power by using a resource template that matches the power allocation scheme comprises:
  if the terminal determines that a usage scene of the terminal is changed to a preset usage scene, updating, by the terminal, the resource template as an updated resource template, wherein the updated resource template is a resource template corresponding to the preset usage scene, and correspondences between a plurality of usage scenes and a plurality of resource templates are prestored by the terminal.

9. A terminal, comprising:
  at least one processor; and
  a memory coupled to the at least one processor and storing programming instructions for execution by the at least one processor, wherein the programming instructions instruct the at least one processor to:
  determine a charge cycle within a time period based on a charge status within the time period, wherein the charge cycle is a time from an end time of current charging to a start time of next charging, the charge cycle is a time from an end time of current charging to an end time of next charging, the charge cycle is a time from a start time of current charging to a start time of next charging, or the charge cycle is a time from a start time of current charging to an end time of next charging;
  predict, based on the charge cycle within the time period, a charge cycle after the time period;
  determine, based on power consumption information in the charge cycle within the time period, a power allocation scheme in the charge cycle after the time period, wherein the power allocation scheme indicates available power in each of a plurality of time segments, or indicates available power of each of a plurality of objects, and each object is one application or one type of application, wherein total power allocated in the power allocation scheme is equal to a difference between remaining battery power and reserve power, and wherein the remaining battery power is calculated based on a power remaining rule determined by the terminal for the charge cycle within the time period, and the reserve power represents power for emergency use; and
  control use of battery power according to the power allocation scheme.

10. The terminal according to claim 9, wherein:
  if the power allocation scheme indicates available power in each of a plurality of time segments in the charge cycle after the time period, the power consumption information comprises power overheads in each of the plurality of time segments in the charge cycle within the time period; or if the power allocation scheme indicates available power of each of a plurality of objects, the power consumption information comprises power overheads of each of the objects in the charge cycle within the time period.

11. The terminal according to claim 9, wherein if the power allocation scheme indicates available power of each of a plurality of objects, the power allocation scheme further indicates backup public power, and the control use of battery power according to the power allocation scheme comprises:
  if remaining power obtained after power allocated to a target object in the plurality of objects is used is less than a preset value, obtaining, according to a first preset rule, partial power that is from the backup public power and that is to be used by the target object.

12. The terminal according to claim 9, wherein if the power allocation scheme indicates available power of each of a plurality of objects, the control use of battery power according to the power allocation scheme comprises:
  if remaining power obtained after power allocated to a target object in the plurality of objects is used is less than a preset value, allocating, according to a second preset rule, partial power that is from power allocated to another object and that is to be used by the target object, wherein the another object is one or more objects in the plurality of objects except the target object.

13. The terminal according to claim 9, wherein the control use of battery power according to the power allocation scheme comprises:
control the use of the battery power by using a resource template that matches the power allocation scheme, wherein
the resource template defines a frequency or a frequency adjustment policy of one or more of a central processing unit (CPU), a graphics processing unit (GPU), or a double data rate (DDR) synchronous dynamic random access memory (SDRAM).

14. The terminal according to claim 13, wherein if the power allocation scheme indicates available power of each of a plurality of objects, the control the use of the battery power by using a resource template that matches the power allocation scheme comprises:
if remaining power obtained after power allocated to a target object in the plurality of objects is used is less than a preset value, update the resource template as an updated resource template, wherein a power consumption speed of the updated resource template is lower than a power consumption speed of a to-be-updated resource template.

15. The terminal according to claim 13, wherein if the power allocation scheme indicates available power in each of a plurality of time segments, the control the use of the battery power by using a resource template that matches the power allocation scheme comprises:
if a power consumption speed in a target time segment in the plurality of time segments is greater than a preset speed threshold, update the resource template as an updated resource template, wherein a power consumption speed of the updated resource template is lower than a power consumption speed of a to-be-updated resource template, and the updated resource template is used by the terminal in one or more time segments after the target time segment.

16. The terminal according to claim 13, wherein the control the use of the battery power by using a resource template that matches the power allocation scheme comprises:
if the terminal determines that a usage scene of the terminal is changed to a preset usage scene, update the resource template as an updated resource template, wherein the updated resource template is a resource template corresponding to the preset usage scene, and correspondences between a plurality of application scenes and a plurality of resource templates are pre-stored by the terminal.

17. A non-transitory computer-readable storage medium coupled to at least one processor of a terminal and storing programming instructions for execution by the at least one processor, wherein the programming instructions cause the at least one processor to perform the following operations:
determining, by a terminal, a charge cycle within a time period based on a charge status within the time period, wherein the charge cycle is a time from an end time of current charging to a start time of next charging, the charge cycle is a time from an end time of current charging to an end time of next charging, the charge cycle is a time from a start time of current charging to a start time of next charging, or the charge cycle is a time from a start time of current charging to an end time of next charging;
predicting, by the terminal and based on the charge cycle within the time period, a charge cycle after the time period;
determining, by the terminal and based on power consumption information in the charge cycle within the time period, a power allocation scheme in the charge cycle after the time period, wherein the power allocation scheme indicates available power in each of a plurality of time segments, or indicates available power of each of a plurality of objects, and each object is one application or one type of application, wherein total power allocated in the power allocation scheme is equal to a difference between remaining battery power and reserve power, and wherein the remaining battery power is calculated based on a power remaining rule determined by the terminal for the charge cycle within the time period, and the reserve power represents power for emergency use; and
controlling, by the terminal, use of battery power according to the power allocation scheme.

18. The non-transitory computer-readable storage medium according to claim 17, wherein:
if the power allocation scheme indicates available power in each of a plurality of time segments in the charge cycle after the time period, the power consumption information comprises power overheads in each of the plurality of time segments in the charge cycle within the time period; or
if the power allocation scheme indicates available power of each of a plurality of objects, the power consumption information comprises power overheads of each of the objects in the charge cycle within the time period.

* * * * *